United States Patent
Suzuki et al.

(10) Patent No.: US 12,186,818 B2
(45) Date of Patent: Jan. 7, 2025

(54) SLIDING CUTTING MACHINE

(71) Applicant: MAKITA CORPORATION, Anjo (JP)

(72) Inventors: Yukinori Suzuki, Anjo (JP); Toshiyuki Kani, Anjo (JP)

(73) Assignee: MAKITA CORPORATION, Anjo (JP)

( * ) Notice: Subject to any disclaimer, the term of this patent is extended or adjusted under 35 U.S.C. 154(b) by 293 days.

(21) Appl. No.: 18/060,750

(22) Filed: Dec. 1, 2022

(65) Prior Publication Data

US 2023/0241694 A1 Aug. 3, 2023

(30) Foreign Application Priority Data

Jan. 12, 2022 (JP) ................... 2022-002938

(51) Int. Cl.
*B23D 49/16* (2006.01)
*B23D 45/04* (2006.01)

(52) U.S. Cl.
CPC .......... *B23D 49/16* (2013.01); *B23D 45/048* (2013.01)

(58) Field of Classification Search
CPC ...... B23D 45/048; B23D 45/44; B23D 49/16; B27D 5/29
USPC ....................................................... 83/471.2
See application file for complete search history.

(56) References Cited

U.S. PATENT DOCUMENTS

| 5,437,214 | A | 8/1995 | Sasaki et al. |
| 5,582,089 | A | 12/1996 | Sasaki et al. |
| 5,660,094 | A | 8/1997 | Sasaki et al. |
| 5,839,339 | A | 11/1998 | Sasaki et al. |
| 5,870,939 | A | 2/1999 | Matsubara |
| 6,532,853 | B1 | 3/2003 | Kakimoto et al. |
| 7,252,027 | B2 | 8/2007 | Meredith et al. |
| 7,854,187 | B2 * | 12/2010 | Liu .......................... B27B 5/29 83/581 |
| 7,997,177 | B2 | 8/2011 | Ushiwata et al. |
| 8,561,513 | B2 | 10/2013 | Ushiwata et al. |
| 9,662,724 | B1 | 5/2017 | Knight |
| 9,833,849 | B2 | 12/2017 | Knight |
| 10,099,301 | B2 | 10/2018 | Chiang et al. |

(Continued)

FOREIGN PATENT DOCUMENTS

| CN | 102343462 A | 2/2012 |
| DE | 202015000495 U1 | 2/2015 |

(Continued)

*Primary Examiner* — Omar Flores Sanchez
(74) *Attorney, Agent, or Firm* — J-TEK LAW PLLC; Jeffrey D. Tekanic; Scott T. Wakeman

(57) ABSTRACT

A sliding cutting machine (1) includes: slide bars (51); a slide base (52), which slides along the slide bars; and a cutting-machine main body (10), which is swingable in an up-down direction about an up-down swing (pivot) shaft (10a) provided on the slide base. The cutting-machine main body includes: an output shaft (37) extending in an axial direction orthogonal to the slide bars and mounting a cutting tool (11); an electric motor (23) between the cutting tool and the slide bars when the cutting tool is vertical, and located more upward than the slide bars; and a motive-power transmitting part (30) transmitting the driving force of the electric motor to the output shaft. The motive-power transmitting part is between the cutting tool and the slide bars and upward of the slide bars when the cutting-machine main body is at a top dead center.

20 Claims, 21 Drawing Sheets

(56) References Cited

U.S. PATENT DOCUMENTS

| | | |
|---|---|---|
| 10,322,459 B1 | 6/2019 | Chang |
| 11,027,344 B2 | 6/2021 | Kani et al. |
| 2004/0079214 A1 | 4/2004 | Meredith et al. |
| 2005/0056131 A1* | 3/2005 | Imamura ............... B23D 45/048 83/581 |
| 2005/0235791 A1 | 10/2005 | Ushiwata et al. |
| 2006/0011036 A1 | 1/2006 | Ushiwata et al. |
| 2006/0042442 A1* | 3/2006 | Ushiwata ................ B27B 5/29 83/167 |
| 2007/0175305 A1 | 8/2007 | Svetlik et al. |
| 2007/0214927 A1* | 9/2007 | Terashima ........... B23D 47/025 83/477.1 |
| 2008/0028908 A1 | 2/2008 | Meredith et al. |
| 2009/0107316 A1 | 4/2009 | Thomas |
| 2009/0120258 A1 | 5/2009 | Meredith et al. |
| 2009/0235796 A1 | 9/2009 | Kani et al. |
| 2011/0209593 A1 | 9/2011 | Kani et al. |
| 2013/0160628 A1 | 6/2013 | Chiu |
| 2015/0114196 A1 | 4/2015 | Meredith et al. |
| 2015/0246400 A1* | 9/2015 | Imamura ............... B23D 47/02 83/471.3 |
| 2016/0318108 A1 | 11/2016 | Gonzalez et al. |
| 2018/0133817 A1 | 5/2018 | Yamamura |
| 2019/0314908 A1* | 10/2019 | Aoyama .................. B27B 5/36 |
| 2020/0055131 A1 | 2/2020 | Kani et al. |
| 2021/0039177 A1 | 2/2021 | Yamamura et al. |
| 2021/0053129 A1 | 2/2021 | Suzuki et al. |
| 2022/0168828 A1* | 6/2022 | Kani .................... B23D 45/048 |
| 2022/0176476 A1* | 6/2022 | Suzuki ................. B23D 45/048 |
| 2022/0362961 A1* | 11/2022 | Lambert ................ B27B 27/06 |
| 2024/0326192 A1* | 10/2024 | Tsai ....................... B23Q 13/00 |

FOREIGN PATENT DOCUMENTS

| | | |
|---|---|---|
| EP | 2969332 B1 | 10/2020 |
| JP | 2005279933 A | 10/2005 |
| JP | 4795097 B2 | 10/2011 |
| JP | 2012066366 A | 4/2012 |
| JP | 5096805 B2 | 12/2012 |
| JP | 2015150633 A | 8/2015 |
| JP | 2018089867 A | 6/2018 |
| WO | 2011012084 A1 | 2/2011 |

* cited by examiner

SLIDING CUTTING MACHINE

CROSS-REFERENCE

The present application claims priority to Japanese patent application serial number 2022-002938 filed on Jan. 12, 2022, the contents of which are hereby fully incorporated by reference.

TECHNICAL FIELD

The present invention generally relates to sliding cutting machines, such as a sliding compound miter saw (e.g., a dual-bevel sliding compound miter saw), that are used to cut a workpiece such as, for example, wood or the like.

BACKGROUND ART

Such a sliding cutting machine typically comprises, for example, one or more elongate slide bars (or slide poles) and a slide base (carriage or slider), which is mounted on the slide bar(s) and is movable (slidable) along the slide bar(s). A cutting-machine main body is mounted (e.g., pivotably mounted) on the slide base. The cutting-machine main body comprises an electric motor and a substantially circular-shaped cutting tool (e.g., a miter saw blade or circular saw blade), which is rotated by an electric motor serving as its motive-power source. A side surface of the cutting tool is parallel to the slide bar(s). The cutting-machine main body is swingable (pivotable) in an up-down direction relative to the slide base. When the cutting tool is rotating and the cutting-machine main body is moved toward a workpiece, which is placed downward of the cutting-machine main body, the cutting tool cuts into the workpiece. Furthermore, by moving (sliding) the cutting-machine main body along the extension direction of the slide bar(s), the cutting tool can be moved in the horizontal direction relative to the workpiece. Thereby, the workpiece also can be cut in the extension direction of the slide bar(s).

So as not to hinder the movement of the cutting tool, the slide bar(s) is (are) disposed rightward of a right-side surface and leftward of a left-side surface of the cutting tool as viewed by the user who is located on the near (front) side of the sliding cutting machine. The miter saw described in US 2005/0235791 has slide bars that extend beside (rightward) of the right-side surface of the cutting tool. A motor housing, which houses the electric motor, is disposed upward of the cutting tool and is disposed such that it protrudes leftward of the cutting tool, which is the side opposite of the slide bars with respect to the cutting tool. Therefore, when the user attempts to visually confirm the cutting location of the cutting tool relative to the workpiece, it is possible that the region that protrudes leftward of the motor housing will obstruct visibility of the workpiece and cutting location. In this case, the user might have to lower his/her head in order to visually confirm the cutting location.

The cutting device described in US 2020/055131 has slide bars that extend beside (leftward) of a left-side surface of the cutting tool. A motor housing, which houses an electric motor, is disposed rightward of the cutting tool and is disposed with a tilted attitude in which the cutting tool is vertical (extends in a vertical plane). More specifically, the motor housing tilts upward as it extends rightward away from the cutting tool, as viewed from the near (front) side of the cutting device (along the extension direction of the slide bars). Therefore, when the user attempts to visually confirm the cutting location of the cutting tool relative to the workpiece, it is possible that the slide bars, which are located leftward of the cutting tool, will obstruct visibility. In this case as well, the user might have to lower his/her head to visually confirm the cutting location.

For example, a DC brushless motor, which operates using electric power supplied from a DC power supply such as a rechargeable battery, an AC brushed motor, which operates using electric power supplied from an AC power supply, or the like may be used as the electric motor that serves as the motive power source for the sliding cutting machine. In particular, if an AC brushed motor is used, the motor diameter is typically larger than that of a comparable DC brushless motor or the like. Consequently, if the electric motor is disposed proximate to the cutting tool, the electric motor is disposed between the cutting tool and the slide bar(s), when viewed from the near side, or is disposed on the left-right opposite side of the slide bar(s) such that it is sandwiched between the cutting tool and the slide bar(s). In the case of the former, the spacing between the cutting tool and the slide bar(s) in the left-right direction widens; in the case of the latter, the spacing between the electric motor and the slide bar(s) in the left-right direction widens. Consequently, the moment of the cutting-machine main body, in which the slide bar(s) serve(s) as the fulcrum, becomes large, and therefore it is difficult to maintain high machine rigidity of the cutting-machine main body. Consequently, the cutting accuracy of the cutting tool could decrease.

SUMMARY OF THE INVENTION

With regard to the arrangement of the electric motor of the known sliding cutting machines described above, it would be desirable to improve (i) the visibility of the cutting-in position of the cutting tool, (ii) the machine rigidity of the cutting-machine main body, (iii) the cutting accuracy of the cutting tool, etc. Accordingly, it is one non-limiting object of the present teachings to disclose a sliding cutting machine, e.g., in which the visibility of the cutting-in position of the cutting tool is satisfactory and the cutting tool can be brought closer to the slide bar(s).

According to one non-limiting aspect of the present disclosure, a sliding cutting machine (e.g., a sliding compound miter saw) may comprise at least one slide bar having an elongated shape and, e.g., extending in a front-rear direction (i.e. along the extension direction of the at least one slide bar). The sliding cutting machine further comprises a slide base (slider, carriage), which is mounted on the at least one slide bar and slides along the at least one slide bar in the front-rear direction. The sliding cutting machine also comprises a cutting-machine main body, which is mounted in a manner swingable (pivotable) relative to the slide base (and the at least one slide bar) in an up-down direction about an up-down swing (pivot) shaft provided on the slide base. The cutting-machine main body comprises an output shaft, which extends in an axial direction orthogonal to the slide bar(s) and on which a cutting tool (e.g., a miter saw blade) is mounted. The cutting-machine main body comprises an electric motor, which is: (i) a motive-power source that drives the output shaft, (ii) provided between the cutting tool and the at least one slide bar when viewed from the front (along the extension direction of the at least one slide bar) in the state in which the cutting tool is vertical, and (iii) located more upward than the at least one slide bar. The cutting-machine main body comprises a motive-power transmitting part (speed-reducing mechanism, transmission, gear set), which is configured to transmit the driving force of a motor shaft of the electric motor to the output shaft. The motive-power transmitting part is provided between the cutting tool and the at least one slide bar when viewed from the front (along the extension direction of the at least one slide bar) and is located upward of the at least one slide bar when the cutting-machine main body is located at a top dead center. Hereinafter, the expression "the cutting tool is vertical" is intended to mean that the cutting tool extends within a plane that is vertical (perpendicular) to a horizontally extending surface (plane), e.g., of a turntable of the sliding cutting machine.

In such an aspect of the present disclosure, because the motive-power transmitting part is provided between the electric motor and the output shaft, the electric motor can be disposed more upward than the at least one slide bar regardless of where the cutting-machine main body is located between the top dead center and a bottom dead center. Consequently, the cutting tool can be disposed more proximate to the at least one slide bar. Thereby, even when the cutting-machine main body is located at the top dead center, the electric motor and the motive-power transmitting part are located more upward than the at least one slide bar. Consequently, when the cutting-machine main body is located at the top dead center, the visibility of the cutting-in position of the cutting tool is satisfactory.

DETAILED DESCRIPTION OF THE EMBODIMENTS

Figure 1:
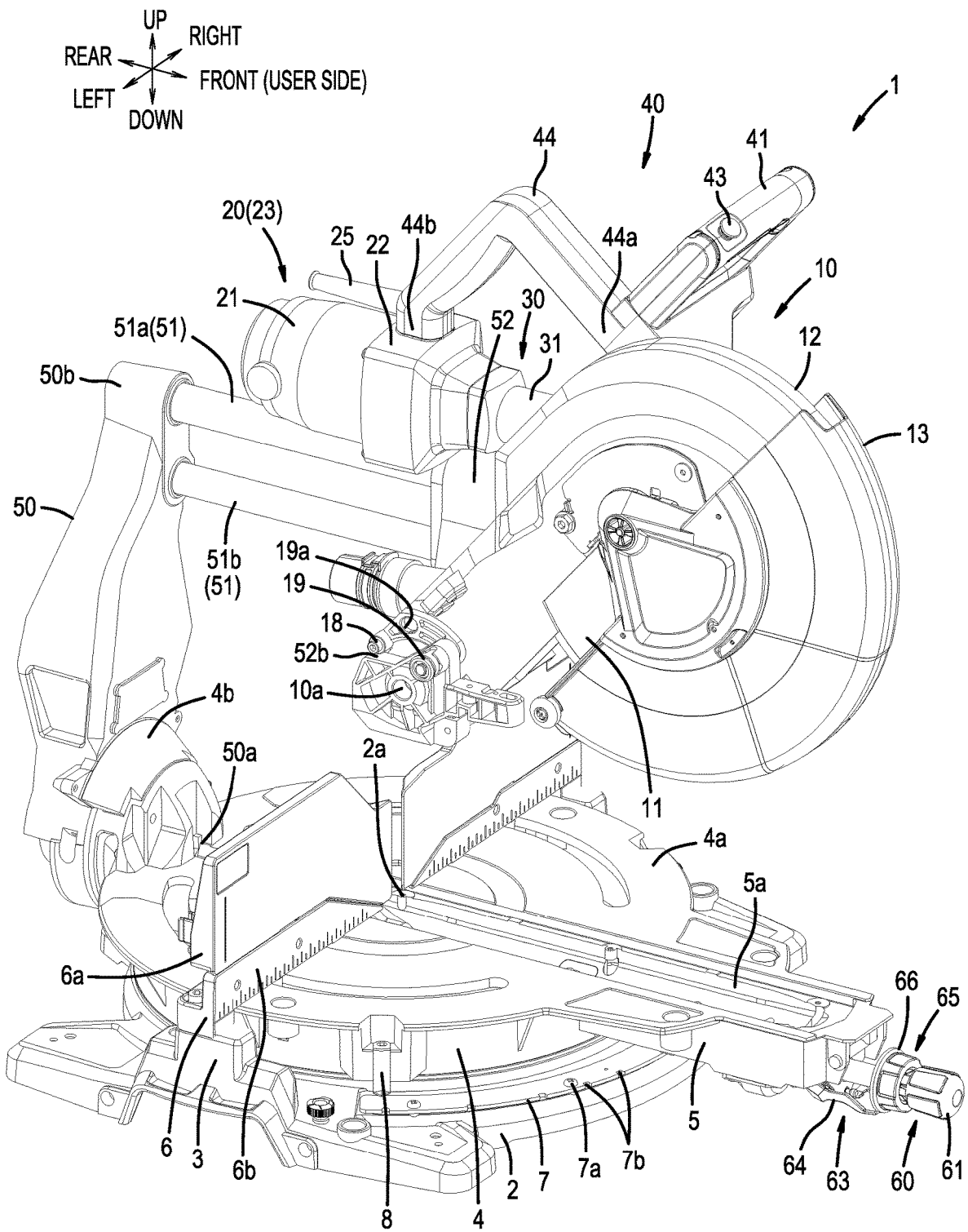
FIG. 1 is an oblique view, viewed from the left, of a sliding cutting machine according to Working Example 1 of the present disclosure.

According to another aspect of the present disclosure, the above-mentioned motive-power transmitting part may preferably comprise a shaft, which is configured to transmit driving force from a motor shaft of the electric motor to the output shaft. The shaft preferably intersects the at least one slide bar when viewed along an axial direction of the shaft and a cutting-machine main body is located at a bottom dead center. In such an embodiment, the shaft is disposed between the cutting tool and the at least one slide bar when viewed from the near side (along the extension direction of the at least one slide bar) and the cutting-machine main body is located at the bottom dead center. When the cutting-machine main body is located at the bottom dead center, the electric motor is disposed upward of the shaft and more upward than the at least one slide bar. The electric motor does not directly contact the slide bars. Consequently, the distance between the cutting tool and the at least slide bar in the axial direction of the output shaft can be decreased. Thereby, the machine rigidity of the cutting-machine main body can be maintained at a high level, and a decrease in the cutting accuracy of the cutting tool can be avoided.

In addition or in the alternative, according to another aspect of the present disclosure, the diameter of the shaft is preferably $1/40$-$1/20$ of the diameter of the cutting tool. In such an embodiment, a shaft having the strength needed to support the electric motor can be provided, and the distance between the cutting tool and the slide bar(s) in the axial direction of the output shaft can be decreased.

In addition or in the alternative, according to another aspect of the present disclosure, a shaft housing, which has a tube shape and houses the shaft, is preferably provided. The shaft housing preferably comprises an expanded portion, which widens (flares, enlarges) in the radial direction of the shaft over the range of a follower-side end of the shaft coupled to the output shaft. In such an embodiment, the shaft housing can be screwed in the axial direction onto a housing on the output-shaft side. Consequently, the sliding cutting device can be assembled in a satisfactory manner, and the support rigidity of the shaft housing can be made high.

In addition or in the alternative, according to another aspect of the present disclosure, the distance in the axial direction of the output shaft from the cutting tool to the at least one slide bar is preferably $3/4$ or less of the diameter of the cutting tool. In such an embodiment, the distance from the cutting tool to the at least one slide bar in the axial direction of the output shaft can be set to the required minimum, and the machine rigidity of the cutting-machine main body, which is supported on the at least one slide bar, can be increased. Consequently, when the cutting tool is caused to cut into a workpiece, shaking of the cutting tool in the axial direction of the output shaft can be curtailed.

In addition or in the alternative, according to another aspect of the present disclosure, when the cutting-machine main body is located at the bottom dead center, the entire electric motor is preferably located between the output shaft and the up-down swing shaft in the front-rear direction (along the extension direction of the at least one slide bar). In such an embodiment, the center of gravity of the cutting-machine main body, which is located at the bottom dead center, can be brought into closer proximity to the up-down swing shaft. Consequently, fluctuations in the load when the cutting-machine main body swings up and down can be decreased. The cutting-machine main body is preferably biased in a direction away from the bottom dead center toward the top dead center by a spring, which is mounted around the up-down swing shaft. By decreasing fluctuations in the load of the cutting-machine main body, the spring load of the spring can be decreased. In addition, the machine rigidity of the cutting-machine main body, in which the up-down swing shaft is the center, can be increased.

In addition or in the alternative, according to another aspect of the present disclosure, when the cutting-machine main body is located at the top dead center, the entire electric motor is preferably located more rearward than the up-down swing (pivot) shaft. In such an embodiment, the cutting-machine main body can be swung upward using the load (intrinsic weight) of the electric motor and returned to the top dead center. Consequently, the spring load of the spring, which biases the cutting-machine main body toward the top dead center, can be decreased.

In addition or in the alternative, according to another aspect of the present disclosure, the motor shaft is preferably parallel to a side surface of the cutting tool when viewed from the radial direction of the motor shaft in the state in which the cutting tool is vertical or is tilted (inclined) by 10° or less relative to the side surface. In such an embodiment, the motor shaft can be disposed with an attitude that follows the side surface of the cutting tool. Consequently, the electric motor can be disposed in closer proximity to the cutting tool in the axial direction of the output shaft. Thereby, the cutting-machine main body can be made more compact in the axial direction of the output shaft.

In addition or in the alternative, according to another aspect of the present disclosure, the center of the electric motor (e.g., a longitudinal center of the electric motor and/or a rotational axis of a rotor of the electric motor) is preferably disposed at a location that is 30%-50% of the distance from the cutting tool to the at least one slide bar in a surface-normal direction of the cutting tool, with the cutting tool serving as the starting point. In such an embodiment, the center of the electric motor is disposed at a location that is more proximate to the cutting tool than to the at least one slide bar, such that the center of gravity of the cutting-machine main body can be brought into closer proximity to the cutting tool in the axial direction of the output shaft. Thereby, when the cutting-machine main body is moved (pivoted, swung) downward and the cutting tool is caused to cut into the workpiece, the twisting moment due to the reaction force that the cutting tool receives from the workpiece and due to the intrinsic weight of the cutting-machine main body can be decreased.

In addition or in the alternative, according to another aspect of the present disclosure, the electric motor is preferably a brushed motor that operates using electric power supplied from an AC power supply. In such an embodiment, even if a brushed motor having a comparatively large motor diameter is utilized, it is possible to avoid hindrance to visibility by the brushed motor when visually confirming the cutting-in position of the cutting tool. In addition, even if a brushed motor is utilized, the distance between the cutting tool and the at least one slide bar in the axial direction of the output shaft can still be decreased.

In addition or in the alternative, according to another aspect of the present disclosure, the at least one slide bar preferably comprises a plurality of slide bars provided (extending) in parallel to each other. The plurality of slide bars includes a first slide bar, which is located most upward, and a second slide bar, which is located most downward. When the diameter of the first slide bar is given as a [mm], the diameter of the second slide bar is given as b [mm], the center-to-center distance between the first slide bar and the second slide bar is given as c [mm], and the diameter of the cutting tool is given as d [mm], the following relationship is preferably satisfied: $(a/2+b/2+c) \times 2 < d < (a/2+b/2+c) \times 3.5$. In such an embodiment, the plurality of slide bars can fit compactly within the range of a length that is shorter than half the diameter of the cutting tool in the up-down direction. Moreover, the distance in the up-down direction, which includes (spans) all of the plurality of slide bars, is larger than $2/7$ times the diameter of the cutting tool. Consequently, the plurality of slide bars can be provided such that they have sufficient strength to be able to support the cutting-machine main body. Thus, it is possible to achieve both compactness and support strength of the slide structure of the cutting-machine main body.

In addition or in the alternative, according to another aspect of the present disclosure, the motor shaft is preferably oriented such that, when the cutting-machine main body is located at the bottom dead center, the motor shaft has (assumes) a tilt angle such that the motor shaft tilts upward as it goes (extends) rearward. In such an embodiment, the amount by which the electric motor protrudes downward when the cutting-machine main body is located at the bottom dead center can be curtailed to the minimum. Thereby, the sliding cutting machine can be made more compact in the up-down direction.

In addition or in the alternative, according to another aspect of the present disclosure, the tilt angle of the motor shaft is preferably 30°-60° relative to the horizontal plane when the cutting-machine main body is located at the bottom dead center. In such an embodiment, a motor housing, which houses the electric motor, can be prevented from making contact with the workpiece. Consequently, the workpiece can be suitably cut using the compactly provided sliding cutting machine.

In addition or in the alternative, according to another aspect of the present disclosure, when the cutting-machine main body is located at the top dead center, the motor shaft is preferably parallel to the horizontal or has (assumes) a tilt angle that is 10° or less relative to the horizontal. In such an embodiment, the amount by which the electric motor protrudes upward and downward can be reduced. Consequently, when visually confirming the cutting-in position of the cutting tool, hindrance to visibility can be prevented.

In addition or in the alternative, according to another aspect of the present disclosure, the sliding cutting machine preferably comprises a manipulatable handle, which is used to move the cutting-machine main body relative to the slide bar(s). When the cutting tool is vertical, the center of the manipulatable handle is preferably located along (in) a virtual plane that includes (contains) the cutting tool when viewed from the front (along the extension direction of the at least one slide bar) and is preferably located between the at least one slide bar and the cutting tool. In such an embodiment, the at least one slide bar and the center of the manipulatable handle can be made more proximate in the axial direction of the output shaft. Consequently, the twisting moment of the cutting-machine main body relative to the at least one slide bar can be decreased at the time when a user grasps the manipulatable handle and causes the cutting tool to cut into the workpiece. Furthermore, the cutting tool and the center of the manipulatable handle can be made more proximate in the axial direction of the output shaft. Consequently, the twisting moment due to the reaction force received by the cutting tool from the workpiece and by the manipulation force with which the manipulatable handle is manipulated can be decreased at the time when the user grasps the manipulatable handle and causes the cutting tool to cut into the workpiece.

In addition or in the alternative, according to another aspect of the present disclosure, the center of the manipulatable handle is preferably disposed at a location that is 30%-70% of the distance from the cutting tool to the at least one slide bar in the axial direction with the cutting tool as the starting point. In such an embodiment, the center of the manipulatable handle is disposed at a location at which it is not spaced too far apart from both the cutting tool and the at least one slide bar. Consequently, the twisting moment of the cutting-machine main body that acts between the cutting tool and the manipulatable handle can be decreased. Moreover, flexure of the at least one slide bar due to the manipulation force with which the manipulatable handle is manipulated can be curtailed.

In addition or in the alternative, according to another aspect of the present disclosure, the sliding cutting machine preferably comprises a bottom-dead-center stopper, which restricts (blocks) movement of the cutting-machine main body to below the bottom dead center. When the cutting tool is vertical, the center of the bottom-dead-center stopper is preferably located between the at least one slide bar and the cutting tool when viewed from the front (along the extension direction of the at least one slide bar). In such an embodiment, the distance between the center of the bottom-dead-center stopper and the at least one slide bar in the axial direction of the output shaft can be decreased. The bottom-dead-center stopper receives a reaction force when the cutting-machine main body is lowered to the bottom dead center. Consequently, by decreasing this distance, the twisting moment of the cutting-machine main body relative to the at least one slide bar due to the reaction force can be decreased.

In addition or in the alternative, according to another aspect of the present disclosure, the center of the bottom-dead-center stopper is preferably disposed at a location that is 30%-70% of the distance from the cutting tool to the at least one slide bar in the axial direction, with the cutting tool serving as the starting point. In such an embodiment, the center of the bottom-dead-center stopper is preferably disposed at a location at which it is not spaced too far apart from both the cutting tool and the at least one slide bar. Consequently, the reaction force received by the bottom-dead-center stopper and the twisting moment of the cutting-machine main body that acts between the at least one slide bar and the cutting-machine main body can be decreased, and shaking of the cutting tool due to the twisting moment can be curtailed.

Figure 2:
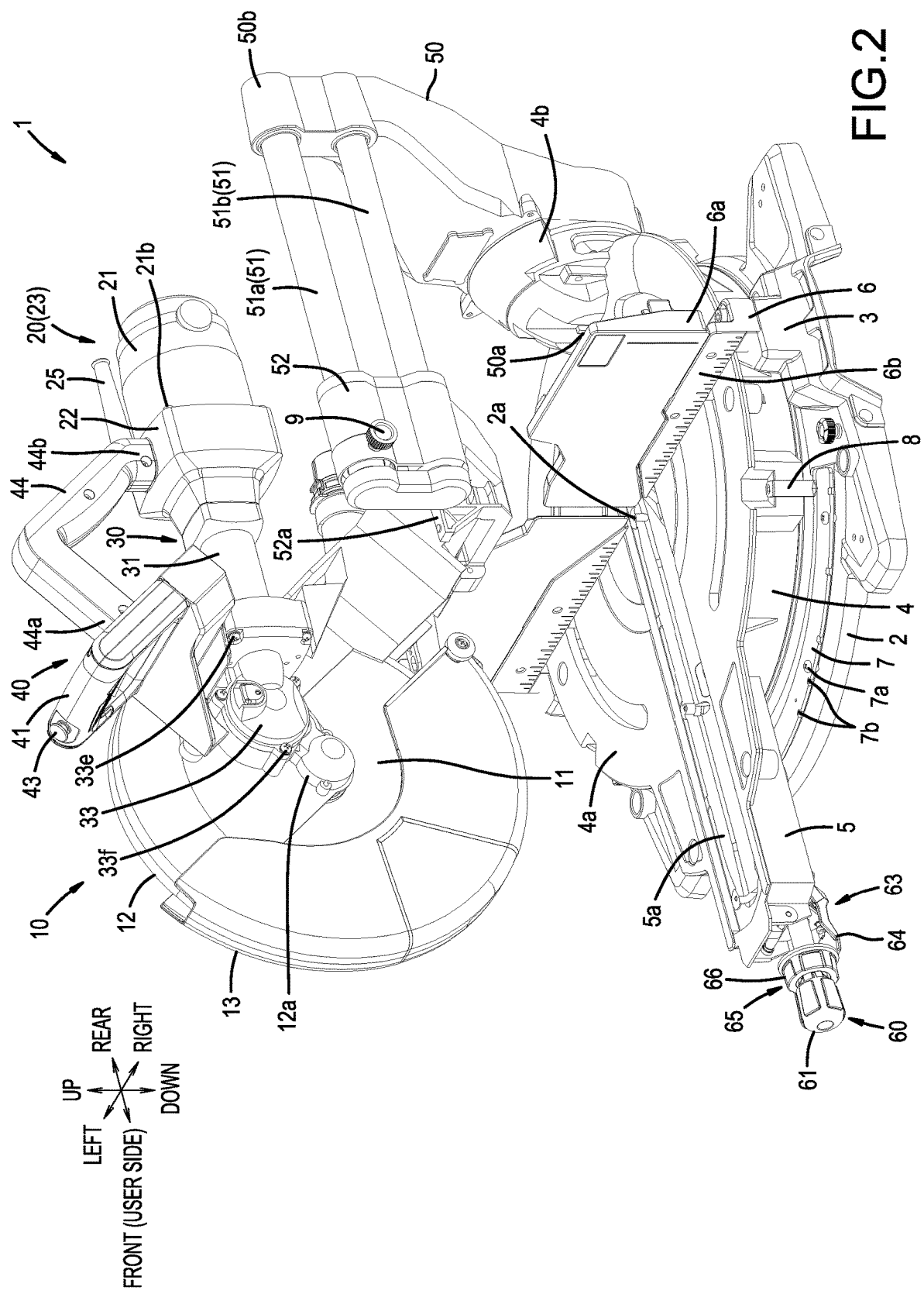
FIG. 2 is an oblique view, viewed from the right, of the sliding cutting machine.
Figure 3:
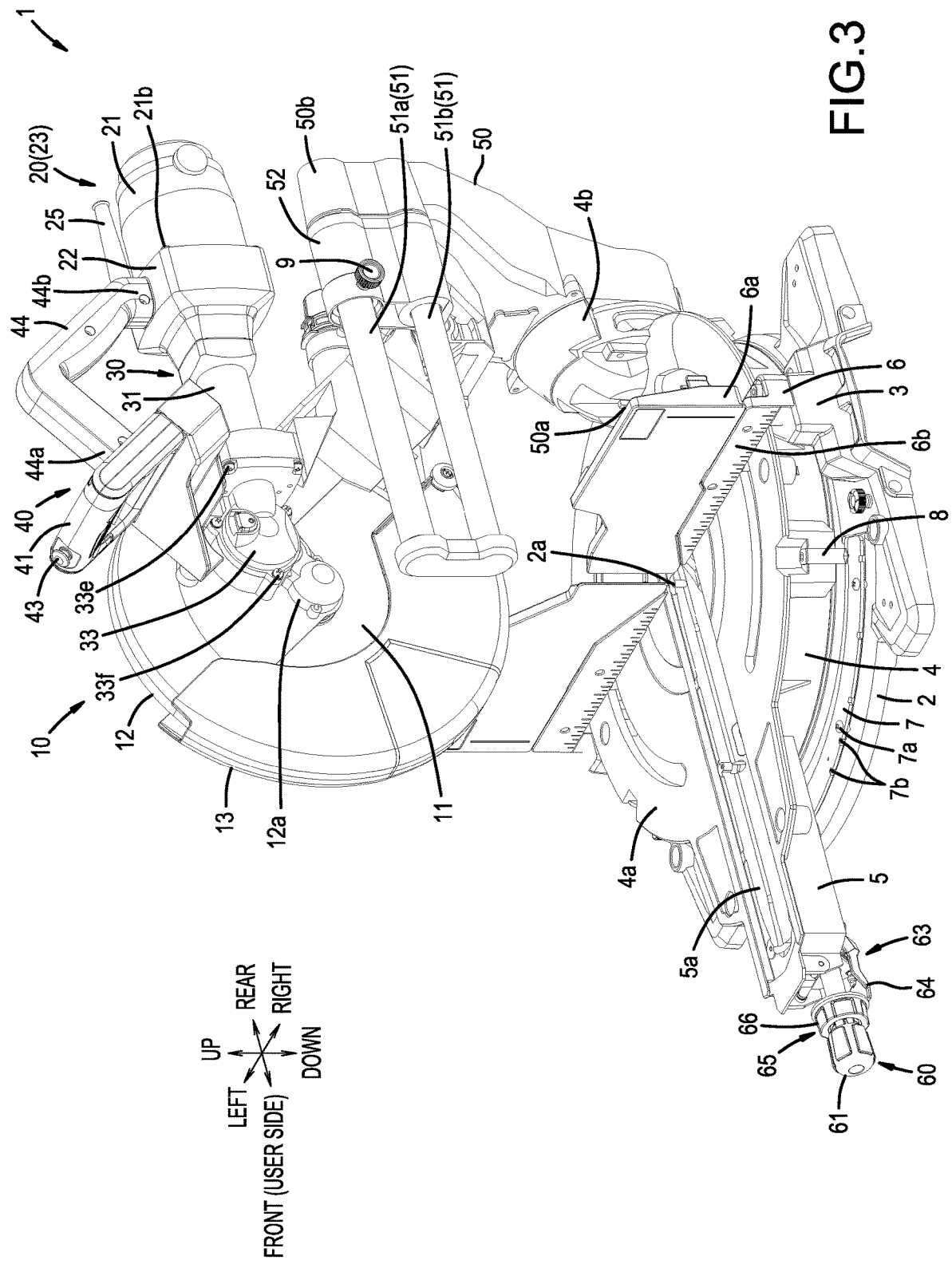
FIG. 3 is an oblique view, viewed from the right, of the sliding cutting machine in the state in which a cutting-machine main body is located at a rear end.

Working Example 1 of the present disclosure will now be explained, with reference to FIGS. 1-15. In the present Working Example 1, a sliding cutting machine 1, which is also known as a sliding compound miter saw or more specifically as a dual-bevel sliding compound miter saw, is illustrated. As shown in FIGS. 1, 2, the sliding cutting machine 1 comprises: a base 2, which is placed on a benchtop, the floor, or the like; a turntable (turn base) 4 for a workpiece to be placed upon (i.e. for supporting the workpiece during a cutting operation); and a cutting-machine main body 10. The turntable 4 is supported such that it is rotatable (pivotable) in the horizontal direction (plane) about a rotary spindle 2a, which extends upward of the base 2 in the up-down direction. The cutting-machine main body 10 is provided upward of the turntable 4. A substantially discoidal (e.g., circular) cutting tool (circular-saw blade) 11, such as a carbide-tipped miter saw blade or circular saw blade, is supported in a rotatable manner by the cutting-machine main body 10. The user typically performs a cutting operation while standing on the near (front) side of the sliding cutting machine 1. In the explanation below, in the front-rear direction, the near side is the front side when viewed from the user. The up-down and left-right directions are defined with reference to the user.

With regard to the turntable 4 as shown in FIGS. 1, 2, a table upper surface 4a, which is substantially circular shaped in plan view, is provided (extends) horizontally (i.e. in the horizontal plane). The rotary spindle 2a is located at the center of the substantially disk-shaped turntable 4. The base 2 comprises upward-protruding parts 3, which are located on both the left and right ends, and the turntable 4 is supported in a horizontally rotatable manner in the space between the left and right upward-protruding parts 3. It is noted that, in the present Working Example 1, the turntable 4 is larger than usual designs, and therefore the left- and right-end portions of the base 2 do not have placement surfaces on which the workpiece can be placed. The turntable 4 comprises a table-extension part (extension arm) 5, which extends forward along a side surface of the cutting tool 11. A slot 5a, which has a notch shape and extends along (in parallel with) the side surfaces of the cutting tool 11, is provided in the center of an upper surface of the table-extension part 5. For the sake of convenience, a kerf board, which is provided at an upper portion of the slot 5a, is not shown in the drawings.

As shown in FIGS. 1 and 2, a positioning fence (guide fence) 6, which has a wall shape extending in the left-right direction and extending upward, is provided upward of the turntable 4 and the upward-protruding parts 3. The positioning fence 6 is supported by the left and right upward-protruding parts 3. A positioning surface 6b, which is a front surface of the positioning fence 6, lies along a vertical plane that passes through the rotary spindle 2a, which is the center of rotation of the turntable 4. When the workpiece is placed on the turntable 4, it is positioned in the front-rear direction by making contact with the positioning surface 6b. An upward-extending fence 6a, which can extend the positioning surface 6b upward, can be detachably mounted upward of the positioning fence 6.

As shown in FIGS. 1 and 2, a miter scale plate 7, which has an arcuate shape, is provided along a substantially half-circumferential region of a front portion of the base 2. The miter scale plate 7 extends in a horizontal plane that is downward of (parallel to) the table upper surface 4a. The miter scale plate 7 cooperates with indicators 8, which are provided on both the left and right sides of the turntable 4, to indicate the rotational (miter) angle of the turntable 4. The rotational (miter) angle of the turntable 4 is the angle between the cutting tool 11 and the positioning surface 6b of the positioning fence 6. By causing the turntable 4 to rotate (pivot) either counterclockwise or clockwise about the rotary spindle 2a, the cutting tool 11 can be set to an attitude that is angled with respect to the positioning surface 6b of the positioning fence 6. The cutting of the workpiece by the cutting tool 11 at this attitude is called a diagonal cut or miter cut. A plurality of groove-shaped positioning recesses 7b extending in the radial direction is provided on the miter scale plate 7. The positioning recesses 7b are provided at prescribed angular intervals in (along) the circumferential direction of the miter scale plate 7. The tip of a positioning pin (lock rod) 64a, which is described below, is capable of entering any one of the positioning recesses 7b. The miter scale plate 7 is fixed to the base 2 by a plurality of fixing screws 7a. The fixing screws 7a are inserted into slots, which pass through the miter scale plate 7 in the up-down direction. By loosening the fixing screws 7a and then shifting the miter scale plate 7 in the left-right direction, the angle between the positioning fence 6 and the cutting tool 11 can be finely adjusted. For example, if the positioning pin 64a is in the state in which it has been inserted into the positioning recess 7b at a right-angle position, then the right angle between the cutting tool 11 and the positioning fence 6 can be precisely adjusted. This adjustment is performed principally in the product-manufacturing process.

As shown in FIGS. 1 and 2, a substantially circular-column-shaped arm-support part 4b, in which the front-rear direction is the axial direction, is provided at a rear portion of the turntable 4. A main-body support arm 50, which extends approximately upward, is provided on a rear side of the arm-support part 4b. The main-body support arm 50 is supported so as to be swingable (tiltable) in the left-right direction relative to the arm-support part 4b about a left-right tilting pivot 50a extending in the front-rear direction. In the state in which the cutting tool 11 extends (is contained) in the vertical plane (that is perpendicular to the horizontal plane defined by the upper turntable surface 4a), the main-body support arm 50 is inclined (bent, curved) such that it extends rightward as it goes (extend) upward. An upper part 50b of the main-body support arm 50 has a shape such that, when a below-described slide base (slider) 52 has been moved toward the rear end, it is retracted from a movable range of the cutting-machine main body 10.

As shown in FIGS. 1 and 2, elongate slide bars (slide poles) 51, which are parallel to the side surface of the cutting tool 11 and extend in the horizontal direction, are mounted on the upper part 50b of the main-body support arm 50. The slide bars 51 are preferably cylinder-shaped with an aspect ratio greater than 10:1, and optionally may be hollow to reduce weight. The slide bars 51 comprise an upward first bar 51a and a downward second bar 51b, which are provided in parallel in the up-down direction. The first bar 51a and the second bar 51b are mounted such that the slide base (slider, carriage) 52 can slide in the front-rear direction. The cutting-machine main body 10 is coupled (attached) the slide base 52 leftward thereof. Consequently, the cutting-machine main body 10 is located more leftward than the first bar 51a and the second bar 51b when the cutting tool 11 is vertical. By sliding the slide base 52 in the front-rear direction (i.e. along the extension direction of the first and second slide bars 51a, 51b), a workpiece (e.g., a wide workpiece) that is placed on the turntable 4 can be cut. A knob 9 is provided on an upper-side, right-side surface of the slide base 52. By rotating the knob 9 in a fastening (tightening) direction, the slide base 52, which is normally slidable relative to the slide bars 51, can be fixed (tightened) at an arbitrary position along the extension direction of the slide bars 51.

Figure 4:
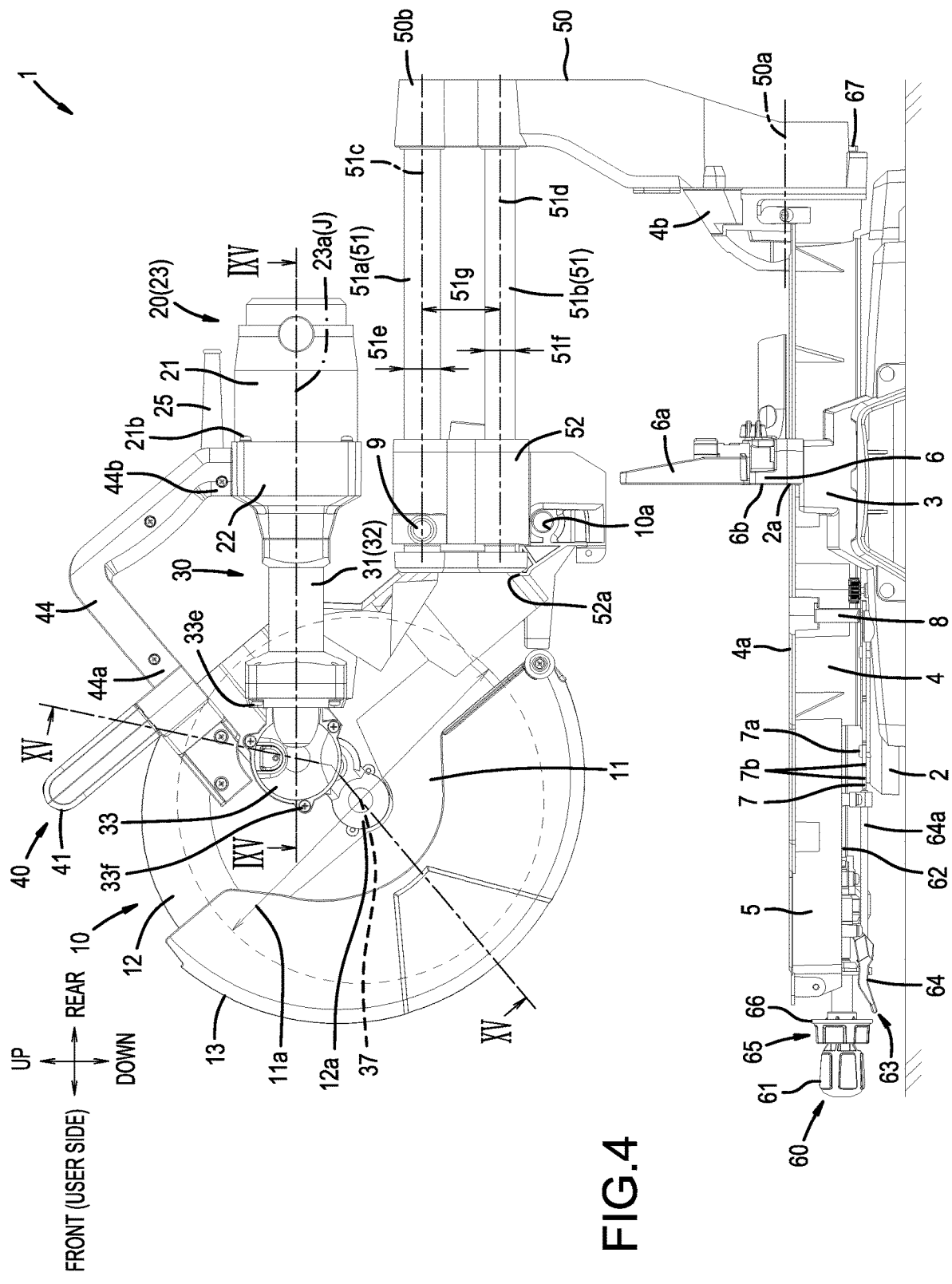
FIG. 4 is a right view of the sliding cutting machine in the state in which the cutting-machine main body is located at a top dead center.
Figure 10:
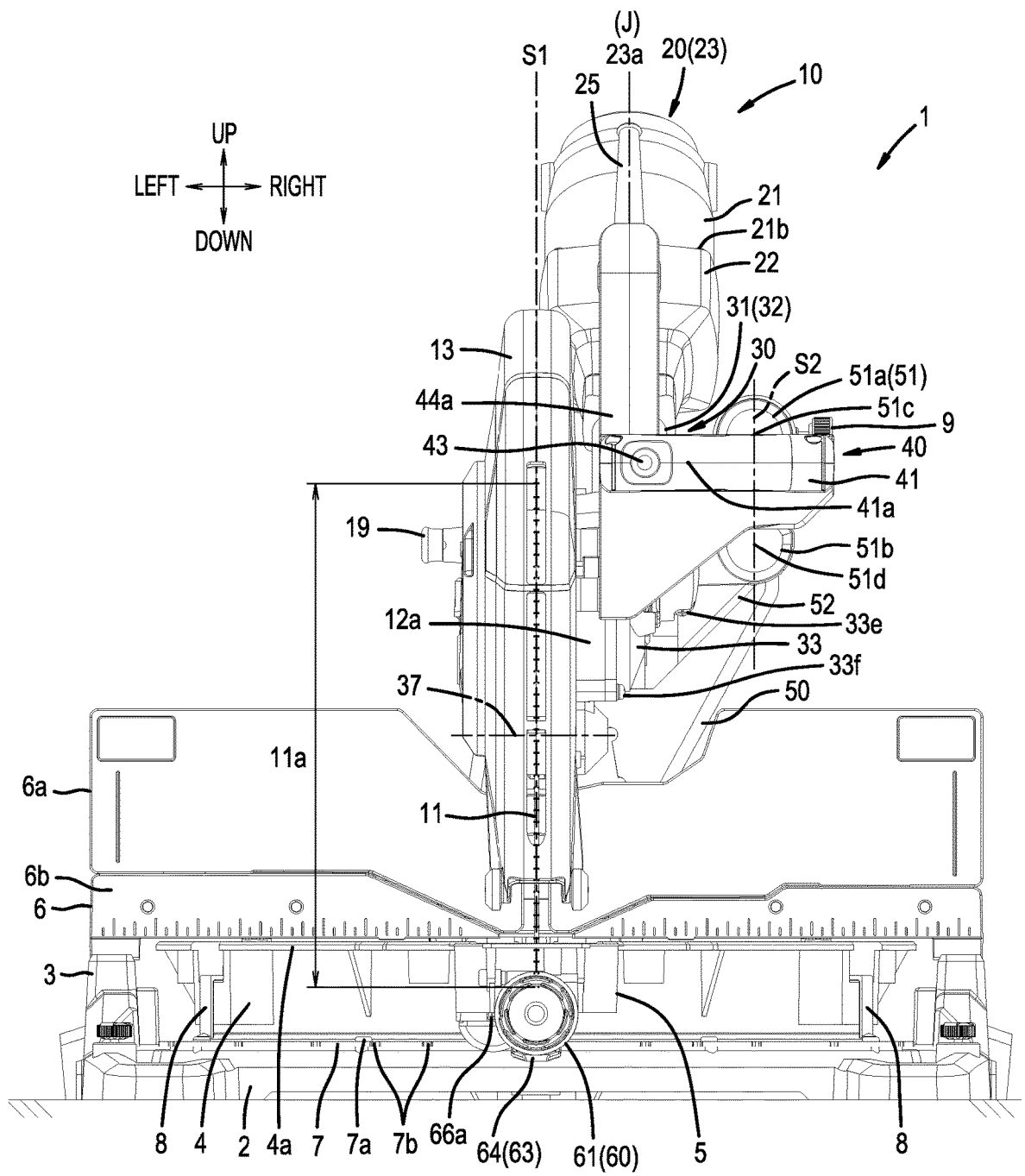
FIG. 10 is a front view of the sliding cutting machine in the state in which the cutting-machine main body is located at the bottom dead center.

As shown in FIGS. 4 and 10, the first bar 51a has a circular-cylinder shape with a diameter 51e of, for example, 30 mm. The second bar 51b has a circular-cylinder shape with a diameter 51f smaller than the diameter 51e, for example, 25 mm. A center 51c of the first bar 51a and a center 51d of the second bar 51b extend parallel to each other in the front-rear direction (along the extension direction of the slide bars 51a, 51b). When the cutting tool 11 is vertical, the location of the center 51c of the first bar 51a and the location of the center 51d of the second bar 51b in the left-right direction are substantially the same. It is noted that a virtual plane that passes through the center of the base metal (plane) of the cutting tool 11 in the thickness direction and that extends parallel to the side surface of the cutting tool 11 is referred to as first virtual plane S1. A virtual plane the passes through the center 51c of the first bar 51a and the center 51d of the second bar 51b is referred to as second virtual plane S2. First virtual plane S1 and second virtual plane S2 are parallel, or at least substantially parallel, to each other.

As shown in FIGS. 4 and 10, the cutting tool 11 rotates about an output shaft 37. The distance between first virtual plane S1 and second virtual plane S2 in the left-right direction (the extension direction of the output shaft 37) is ¾ or less of a diameter 11a of the cutting tool 11 and preferably is ½ or less of the diameter 11a of the cutting tool 11. The distance between first virtual plane S1 and second virtual plane S2 is, for example, 132 mm when the diameter 11a is set to 305 mm. The center 51c of the first bar 51a and the center 51d of the second bar 51b are disposed spaced apart by center-to-center distance 51g, for example, 65 mm, in the up-down direction. The diameters 51e, 51f and the center-to-center distance 51g are set such that the relationship in Equation 1 below is satisfied, wherein the diameter 51e is given as a [mm], the diameter 51f is given as b [mm], the center-to-center distance 51g is given as c [mm], and the diameter 11a of the cutting tool 11 is given as d [mm]. For example, in an embodiment the sliding cutting machine 1, in which a cutting tool 11 having the diameter 11a of 305 mm is mounted on the cutting machine 1, the diameters 51e, 51f and the center-to-center distance 51g are preferably set such that 305/3.5=87 mm<(a/2+b/2+c)<305/2=153 mm.

$$(a/2+b/2+c)\times 2 < d < (a/2+b/2+c)\times 3.5 \qquad \text{Equation 1:}$$

Figure 11:
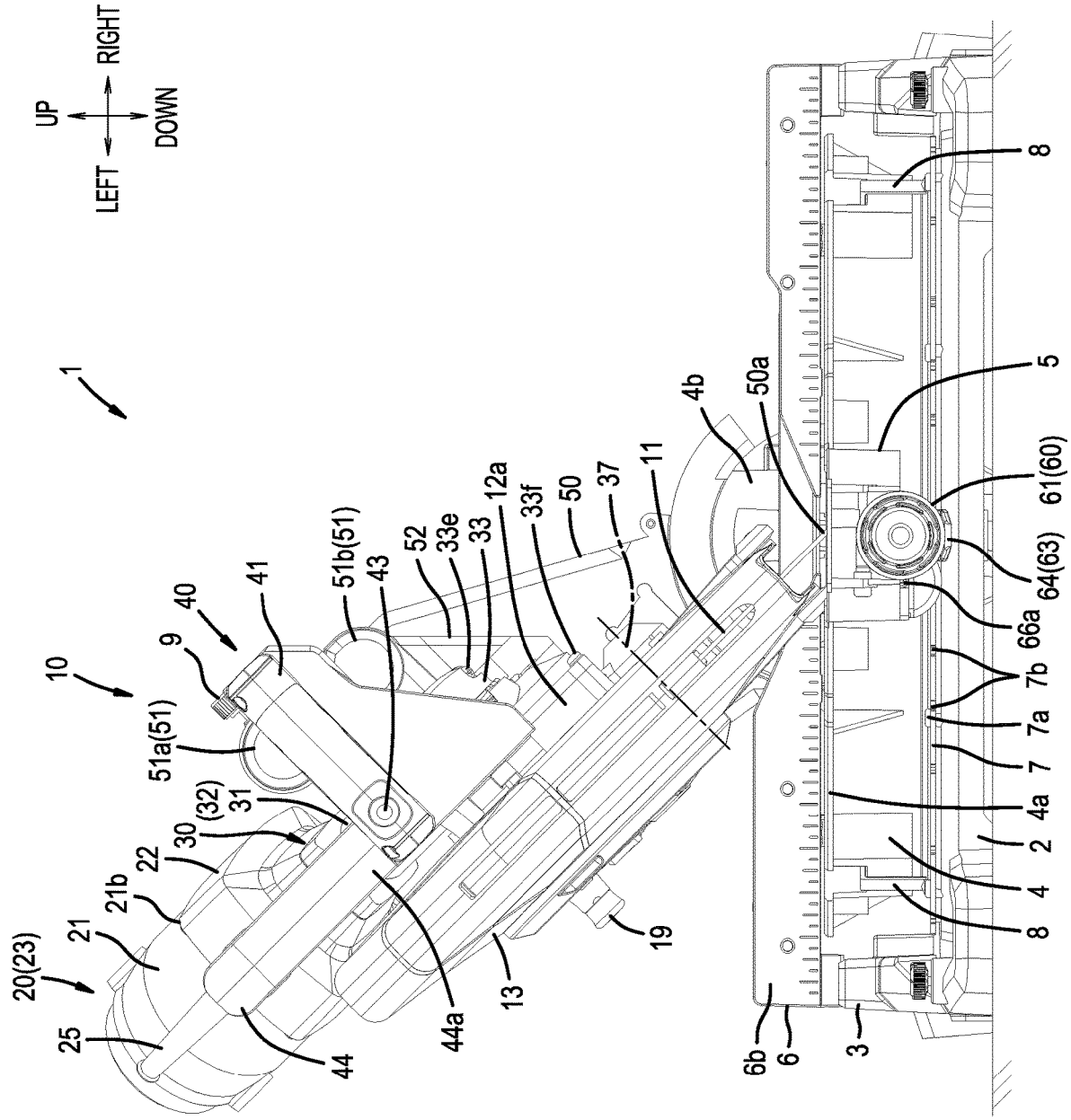
FIG. 11 is a front view of the sliding cutting machine in the state in which the cutting-machine main body is located at the bottom dead center and tilted leftward.
Figure 12:
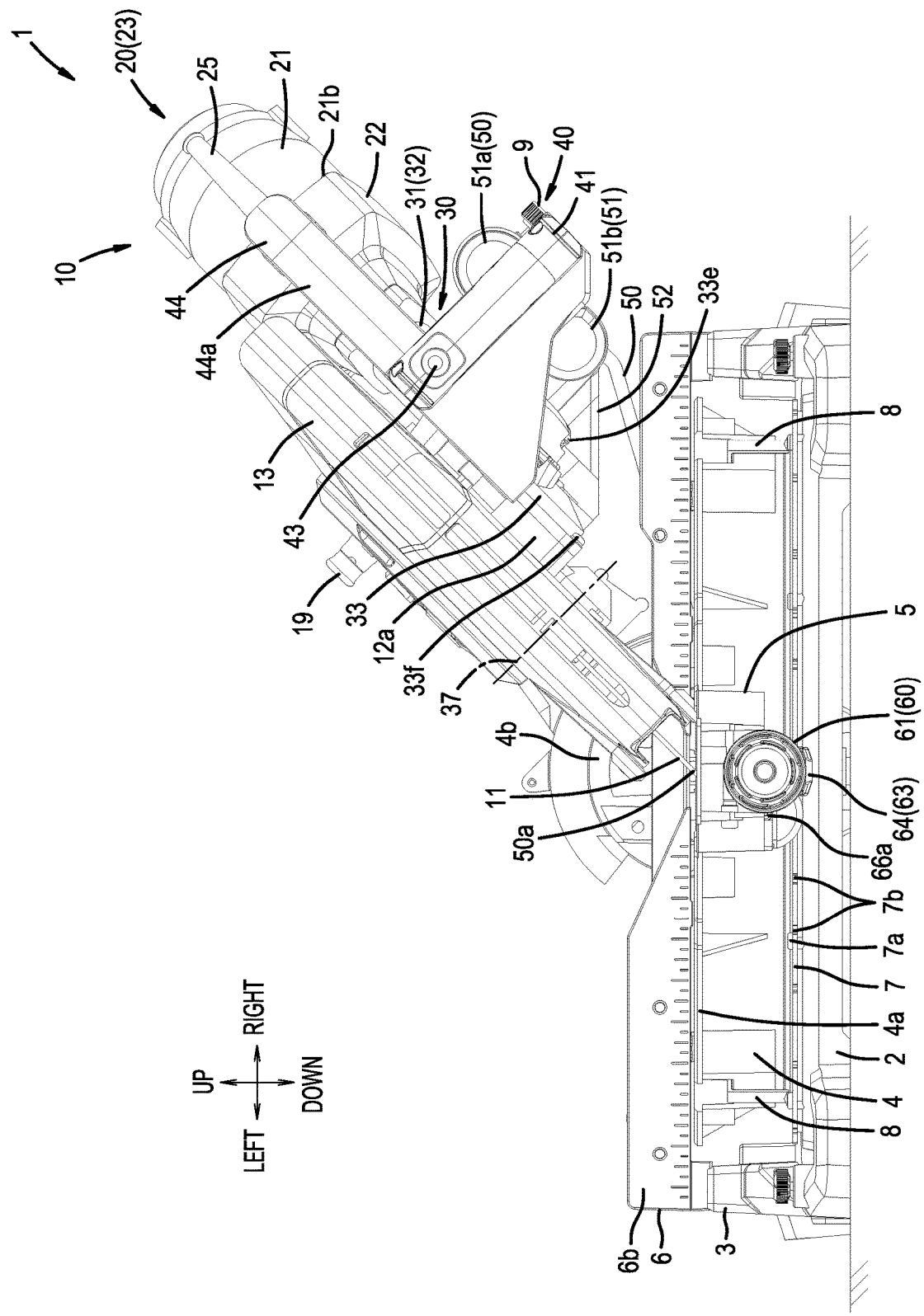
FIG. 12 is a front view of the sliding cutting machine in the state in which the cutting-machine main body is located at the bottom dead center and tilted rightward.

As shown in FIGS. 11 and 12, the main-body support arm 50 can be tilted up to 45° in the left and right directions about the left-right tilting pivot (shaft) 50a. In addition, by switching a tilt-positioning mechanism (which is provided at a rear portion of the main-body support arm 50, although not shown in the drawings for the sake of convenience), the main-body support arm 50 can be tilted up to a maximum of 48°. Consequently, the cutting tool 11 as well can be tilted up to a maximum of 48° in the left and right directions about the left-right tilting pivot 50a. By tilting the cutting tool 11 in the left-right direction, a so-called oblique cut or bevel cut can be performed on the workpiece placed on the turntable 4. When the cutting-machine main body 10 is caused to tilt leftward, there is no protruding portion leftward of the cutting tool 11 or around a lower-side portion of the cutting tool 11 (in the drawings, a movable cover 13 is located around the lower side of the cutting tool 11 but actually moves upward). Consequently, other than the cutting tool 11, the cutting-machine main body 10 does not contact the workpiece, and therefore an oblique or bevel cut can be suitably performed without hinderance. When the cutting-machine main body 10 is caused to tilt rightward, there is no protruding portion rightward of the cutting tool 11 or around the lower-side portion of the cutting tool 11. Consequently, other than the cutting tool 11, the cutting-machine main body 10 does not contact the workpiece, and therefore an oblique or bevel cut can be suitably performed without hinderance.

Figure 5:
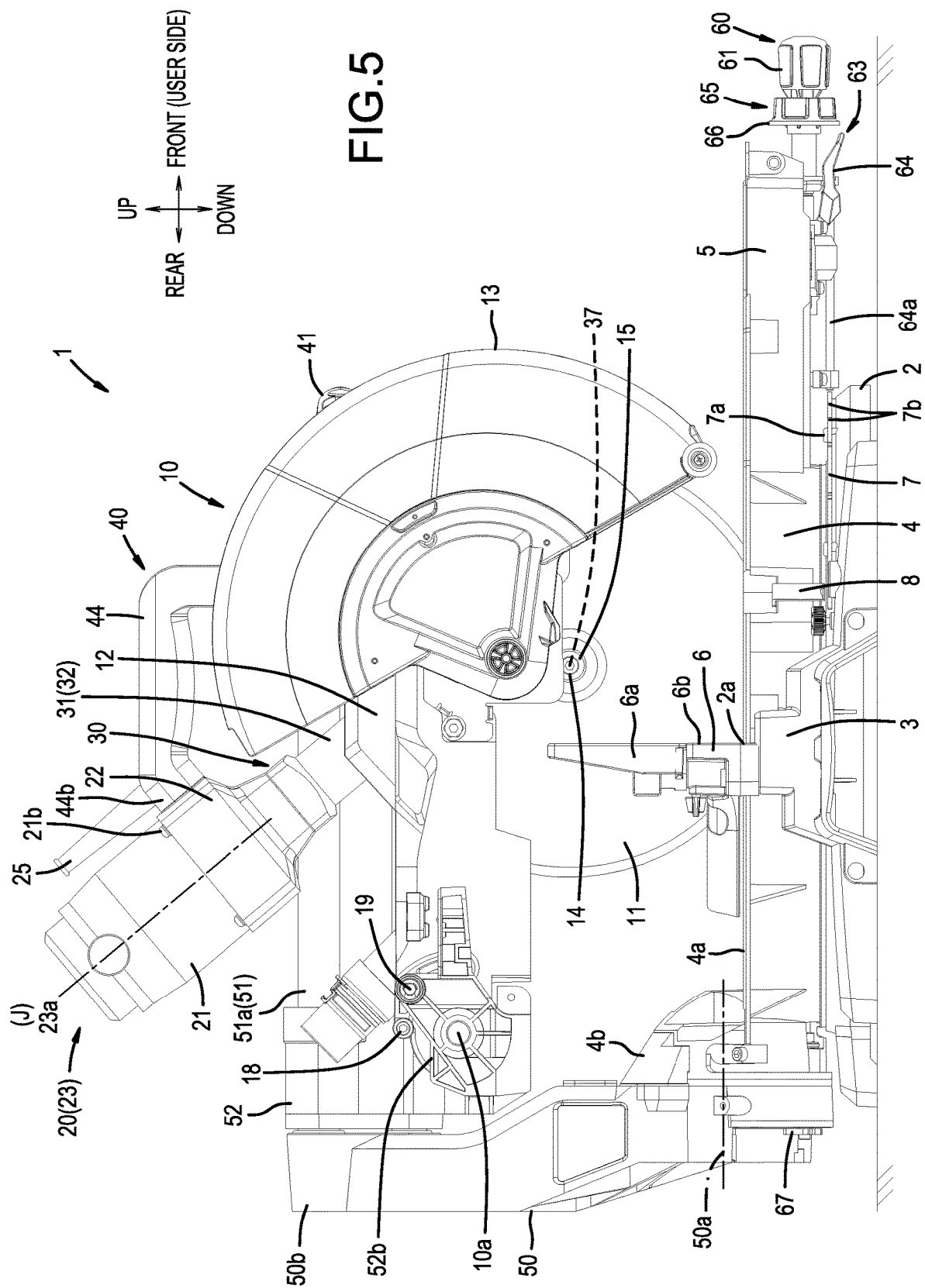
FIG. 5 is a left view of the sliding cutting machine in the state in which the cutting-machine main body is located at a bottom dead center and located at the rear end.

As shown in FIGS. 4 and 5, the cutting-machine main body 10 is swingable (pivotable) relative to the slide base 52 in the up-down direction about an up-down swing shaft (pivot shaft) 10a, which extends in the left-right direction. The up-down swing shaft 10a is located rearward of the cutting tool 11. By causing the cutting-machine main body 10 to swing downward, the cutting tool 11 can cut into the workpiece placed on the turntable 4. With regard to the swing angle of the cutting-machine main body 10 in the up-down direction, if the bottom dead center (lower pivot limit) is set to 0°, then the top dead center (upper pivot limit) is 40°. In other words, the cutting-machine main body 10 is capable of swinging (pivoting) up and down over an angular range of 40°. A torsion spring, which biases the cutting-machine main body 10 upward toward the top dead center, is provided around the up-down swing shaft 10a.

As shown in FIGS. 4 and 5, the cutting-machine main body 10 comprises a fixed cover 12 and the movable cover 13, which cover the cutting tool 11. The fixed cover 12 covers, on both the left and right sides and radially outward, the range of the upper-side half circumference of the cutting tool 11. The movable cover 13 is capable of covering the range of the lower-side half circumference of the cutting tool 11. The movable cover 13 rotates in conjunction with the up-down swing of the cutting-machine main body 10 and opens and closes over a range of the lower-side half circumference of the cutting tool 11. When the cutting-machine main body 10 is caused to tilt upward, the movable cover 13 rotates in the closed-position direction (clockwise direction in FIG. 5). Consequently, when the cutting-machine main body 10 is located at the top dead center, the lower-side half circumference range of the cutting tool 11 is covered. When the cutting-machine main body 10 is caused to tilt downward, the movable cover 13 rotates in the open-position direction (counterclockwise direction in FIG. 5). Consequently, the lower-side half circumference range of the cutting tool 11 is exposed, and therefore the cutting tool 11 can cut into the workpiece placed on the turntable 4.

Figure 14:
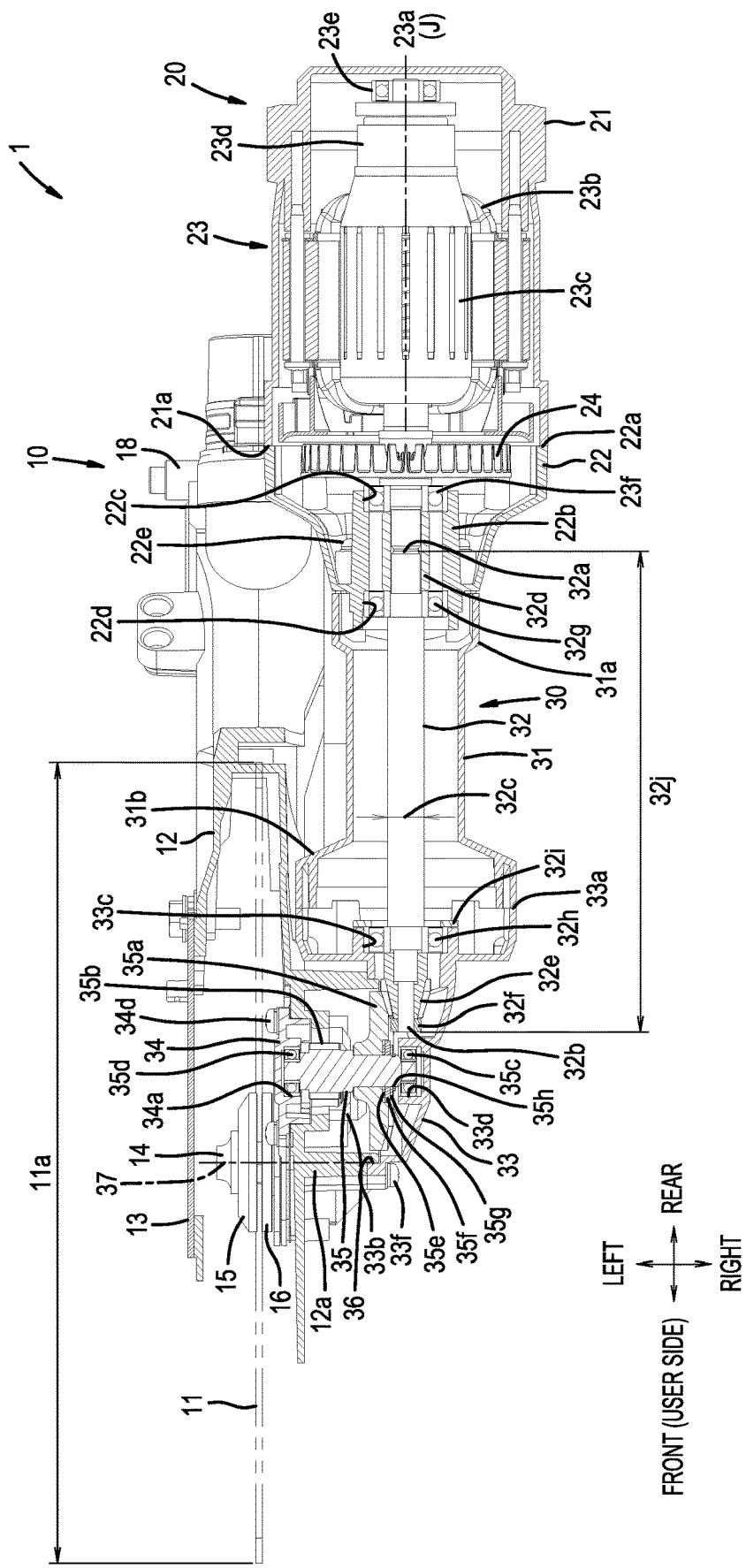
FIG. 14 is a cross-sectional auxiliary view taken along line XIV-XIV in FIG. 4.
Figure 15:
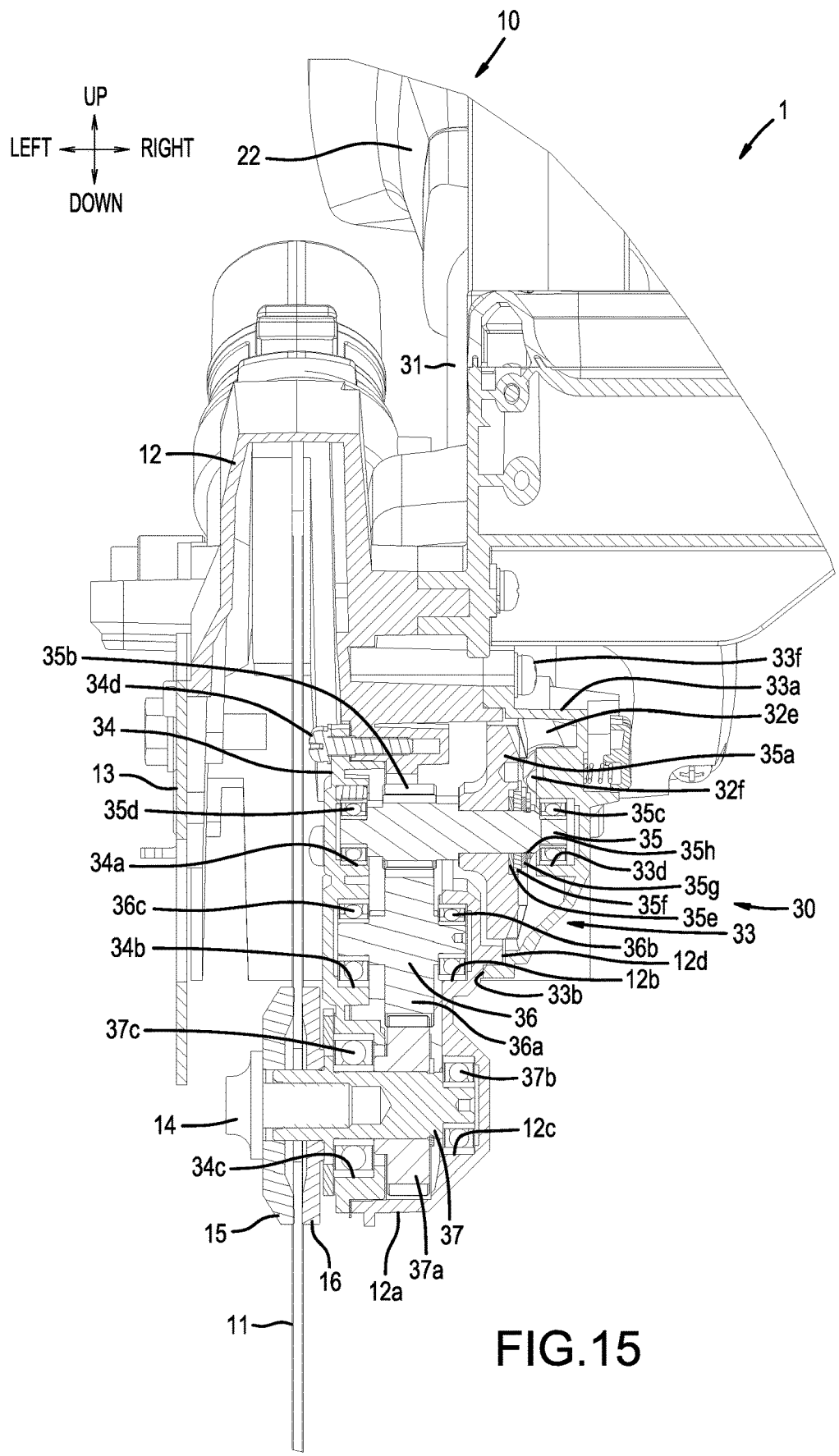
FIG. 15 is a cross-sectional auxiliary view taken along line XV-XV in FIG. 4.

As shown in FIGS. 14 and 15, the cutting tool 11 is fixedly (but removably) mounted on the output shaft 37, which extends in the left-right direction and is supported in a rotatable manner on the cutting-machine main body 10. The cutting tool 11 is mounted on the output shaft 37 by tightening a fixing screw 14 while the center of rotation of the cutting tool 11 is sandwiched by an outer flange 15 and an inner flange 16.

Figure 13:
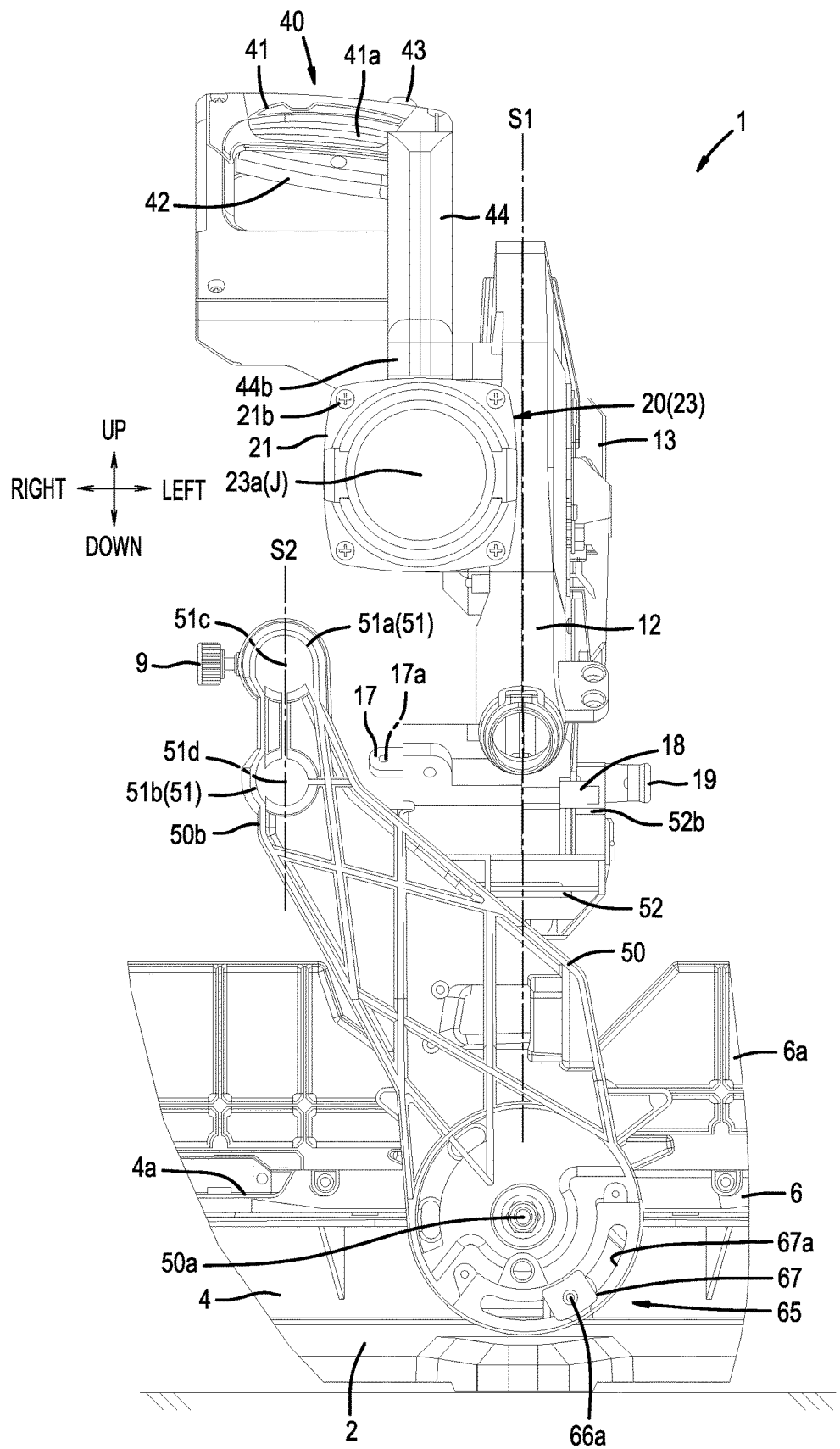
FIG. 13 is a rear view of the sliding cutting machine in the state in which the cutting-machine main body is located at the top dead center.

As shown in FIG. 13, a bottom-dead-center stopper 17 is provided on a right-side portion of the cutting-machine main body 10. The bottom-dead-center stopper 17 comprises a bolt, which is screw-coupled to the cutting-machine main body 10 and protrudes downward. The length by which the bottom-dead-center stopper 17 protrudes can be changed by, for example, inserting a hexagonal-rod spanner (Allen (hex) wrench) into a hexagonal hole in the head portion of a bolt and rotating the hexagonal-rod spanner. Thereby, the location of bottom dead center (lower pivot limit) of the cutting-machine main body 10 can be finely adjusted. A bottom-dead-center, stopper-contact part 52a (refer to FIG. 4), which makes contact with (abuts) the tip of the bottom-dead-center stopper 17 when the cutting-machine main body 10 is lowered to the bottom dead center, is provided on the front surface of the slide base 52. The bottom-dead-center, stopper-contact part 52a is a flat surface that is provided on an upper surface of a projection portion that protrudes forward from the front surface of the slide base 52.

As shown in FIG. 13, the bottom-dead-center stopper 17 is located between the side surface of the cutting tool 11 and the slide bars 51 in the left-right direction. When the cutting tool 11 is vertical and the cutting-machine main body 10 is located at the top dead center, a center 17a of the bottom-dead-center stopper 17 is located rightward of first virtual plane S1, which passes through the center of the cutting tool 11, and is located leftward of second virtual plane S2, which passes through the center 51c of the first bar 51a. The center 17a preferably is disposed at a location that is 30%-70% of the distance from first virtual plane S1 to second virtual plane S2 rightward in the surface-normal direction of the cutting tool 11, with first virtual plane S1 serving as the starting point, e.g., the center 17a is disposed at a location that is 58% of that distance. The distance from first virtual plane S1 to the center 17a is, for example, 76.5 mm. That is, if the distance from first virtual plane S1 to second virtual plane S2 is 132 mm, then 76.5 mm/132 mm=58%.

Figure 8:
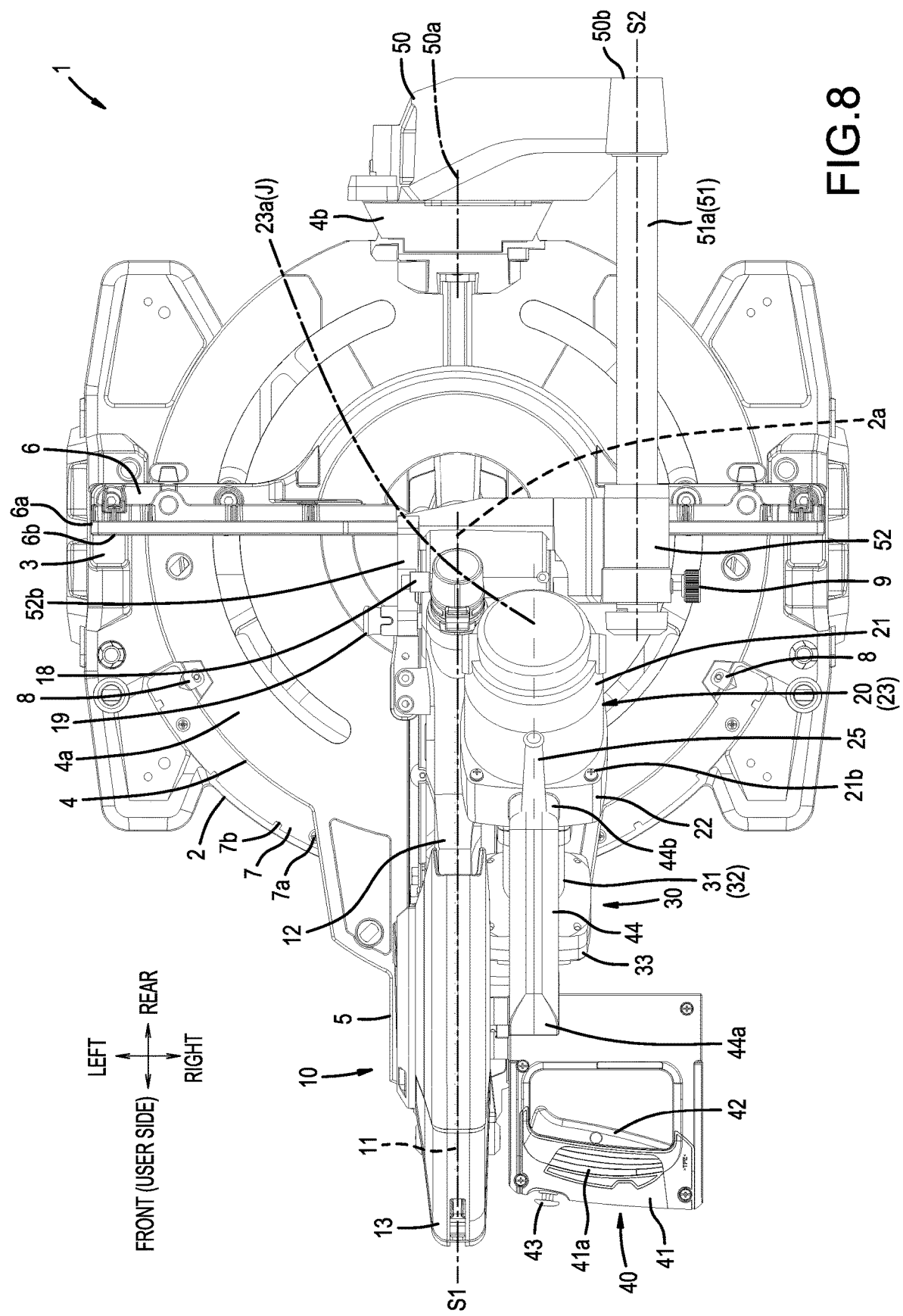
FIG. 8 is a plan view of the sliding cutting machine in the state in which the cutting-machine main body is located at the bottom dead center.

As shown in FIGS. 5, 8 and 13, a top-dead-center stopper 18, which protrudes leftward, is provided at a left-side portion of the fixed cover 12. A top-dead-center, stopper-contact part 52b, which is planar and is capable of making contact with (abutting) the top-dead-center stopper 18, is provided on the upper surface of the left-side portion of the slide base 52. The upward movement of the cutting-machine main body 10 is stopped at the top dead center when the top-dead-center stopper 18 and the top-dead-center, stopper-contact part 52b make contact (abut).

As shown in FIG. 1, a bottom-dead-center lock pin 19, which protrudes leftward, is provided on a left-side surface of a front portion of the slide base 52. A through hole 19a, which extends forward of the top-dead-center stopper 18 in the left-right direction, is provided in the fixed cover 12. The bottom-dead-center lock pin 19 is capable of entering the through hole 19a by moving rightward when the cutting-machine main body 10 moves (pivots) to the bottom dead center. The cutting-machine main body 10 can be locked at the bottom dead center by pushing the left end of the bottom-dead-center lock pin 19 rightward so that it enters the through hole 19a.

Figure 9:
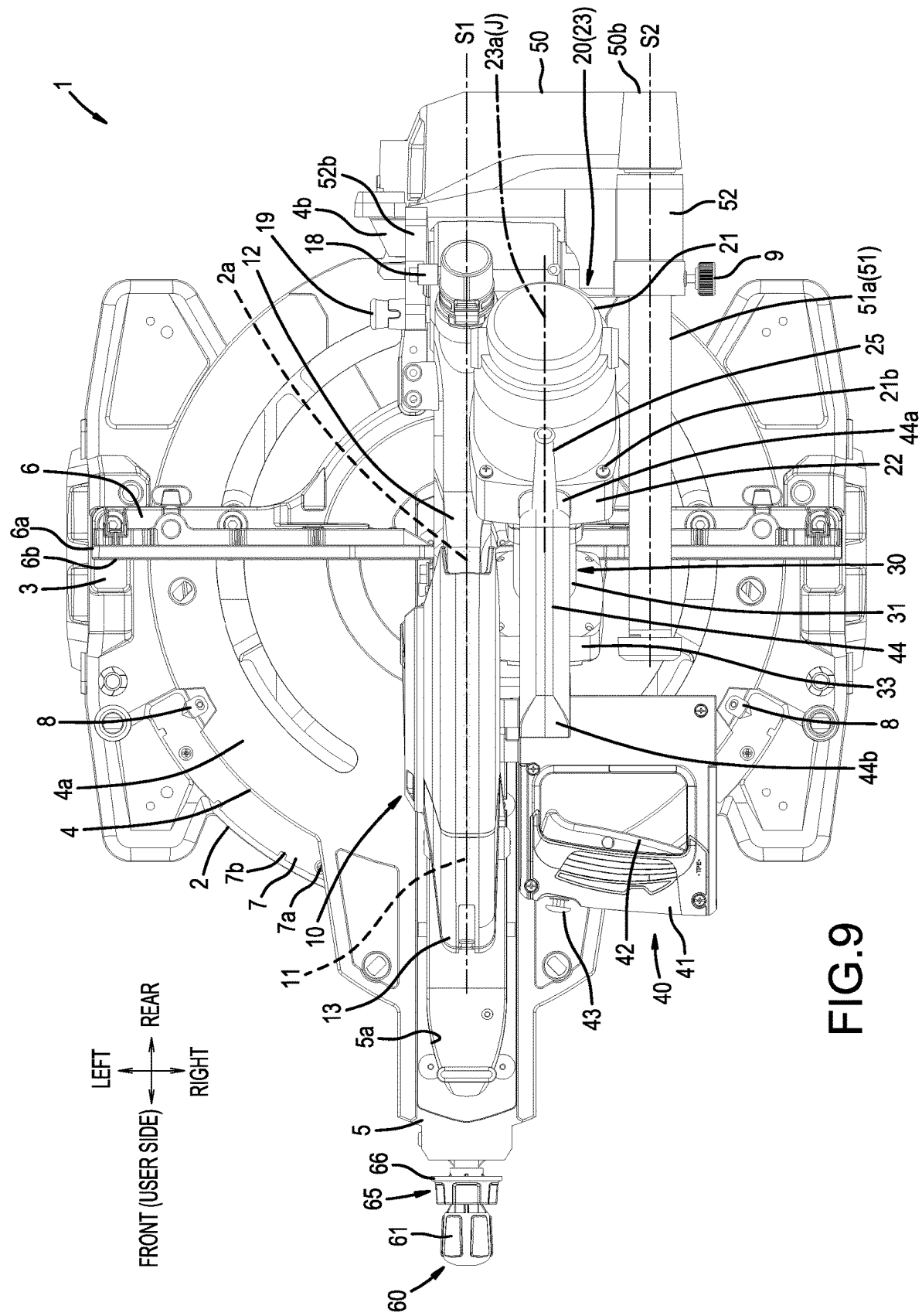
FIG. 9 is a plan view of the sliding cutting machine in the state in which the cutting-machine main body is located at the bottom dead center and located at the rear end.

As shown in FIGS. 8-10, the cutting-machine main body 10 comprises a motor housing 20 between the cutting tool 11 and the slide bars 51 in the left-right direction. An electric motor 23 is housed in the motor housing 20. A motor shaft 23a is provided at the center of the electric motor 23. The motor shaft 23a extends in the front-rear direction along motor axis J, which is parallel to the side surface of the cutting tool 11. The motor housing 20 is formed by coupling the rear-portion housing 21, which is rearward, and the front-portion housing 22, which is forward, in the front-rear direction. The rear-portion housing 21 is substantially circular-tube shaped and protrudes in the front-rear direction. The front-portion housing 22 is substantially conical shaped, in which the diameter becomes smaller as it goes (extends) forward from rearward. A power-supply cord 25, which is connectable to an external AC power supply, is provided on the upper side of the motor housing 20. The power-supply cord 25 extends rearward along a longitudinal direction of the motor housing 20 (in the drawings, for the sake of convenience, only the cord guard is shown, and other portions of the power-supply cord 25 are omitted).

As shown in FIG. 14, the inner diameter of a front end 21a of the rear-portion housing 21 is larger than that of a rearward region of the rear-portion housing 21. The inner diameter of a rear end 22a of the front-portion housing 22 is larger than that of a forward area of the front-portion housing 22. The front end 21a of the rear-portion housing 21 and the rear end 22a of the front-portion housing 22 are coupled by a plurality of fixing screws 21b (refer to FIG. 9) extending in the direction of motor axis J.

As shown in FIGS. 4, 14, an AC brushed (commutated) motor, which operates using electric power supplied from the AC power supply, is used as the electric motor 23. The motor shaft 23a is supported by a first bearing 23e and a second bearing 23f such that it is rotatable about motor axis J. An inner ring of the first bearing 23e is press-fitted onto the rear end of the motor shaft 23a, and an outer ring of the first bearing 23e is press-fitted into a hole part provided at an inner-side rear end of the rear-portion housing 21. A shaft-support part 22b, which extends in the front-rear direction and has a circular-cylinder shape, is provided on an inner side of the front-portion housing 22. An inner ring of the second bearing 23f is press-fitted onto a front portion of the motor shaft 23a, and an outer ring of the second bearing 23f is press-fitted into a hole part 22c provided at the rear end of the shaft-support part 22b.

As shown in FIG. 14, a stator 23b of the electric motor 23 is supported in a non-rotatable manner on (by) an inner-circumferential surface of the rear-portion housing 21. A rotor 23c of the electric motor 23 is disposed in the interior of the stator 23b. The rotor 23c is mounted along the outer circumference of the motor shaft 23a and is rotatable together with the motor shaft 23a. A commutator 23d is mounted rearward of the rotor 23c. An air-intake port, which is capable of taking in outside air, is provided in a rear surface of the rear-portion housing 21. A fan 24 is mounted in a rotatable manner, integrally with the motor shaft 23a, between the second bearing 23f and the rotor 23c at the front portion of the motor shaft 23a. The fan 24 is housed on the inner-circumference side of the rear end 22a of the front-portion housing 22. When the electric motor 23 is caused to operate and the fan 24 rotates, a cooling draft is introduced from the air-intake port into the motor housing 20. The cooling draft flows toward the fan 24, which is forward, and is exhausted from an air-exhaust port, which is provided in the front-portion housing 22 radially outward of the fan 24. Owing to the cooling draft, the electric motor 23 is cooled.

As shown in FIGS. 8 and 10, the cutting-machine main body 10 comprises a motive-power transmitting part 30, which transmits the driving force (rotational output) of the motor shaft 23a to the output shaft 37, between the cutting tool 11 and the slide bars 51 in the left-right direction. The motive-power transmitting part 30 is housed in a shaft housing 31, a gear housing 33, and a gear-housing part 12a, which is provided at a right-side portion of the fixed cover 12. The shaft housing 31 is coupled to an opening in the front end of the front-portion housing 22. The gear housing 33 couples the opening in the front end of the shaft housing 31 and an opening in the right end of the gear-housing part 12a.

As shown in FIG. 14, the shaft housing 31 has a substantially circular-tube shape and extends along (beside, in parallel with) the side surface of the cutting tool 11. A motor-housing coupling part 31a at the rear end of the shaft housing 31 and a gear-housing coupling part 31b at the front end of the shaft housing 31 are expanded (widened, flared) more than a center area of the shaft housing 31. The inner diameter of the gear-housing coupling part 31b is larger than that of the motor-housing coupling part 31a. The motor-housing coupling part 31a is coupled to the front end of the front-portion housing 22 by a spigot-joint structure, which covers the outer circumference of the shaft-support part 22b. The motor-housing coupling part 31a and the front end of the front-portion housing 22 are coupled by a plurality of fixing screws 22e extending in the direction of motor axis J. The gear-housing coupling part 31b is coupled to a shaft-housing coupling part 33a at the rear end of the gear housing 33 by a plurality of fixing screws 33e (refer to FIG. 4) extending in the direction of motor axis J.

As shown in FIG. 14, an elongated, straight shaft 32 is housed in the shaft housing 31. The shaft 32 is disposed coaxially with the motor shaft 23a. The shaft 32 has a circular-column shape with a diameter 32c that is $1/40$-$1/20$ of the (outer) diameter 11a of the cutting tool 11. The diameter 32c is, for example, 10 mm when the diameter 11a of the cutting tool 11 is set to 305 mm. The front end of the motor shaft 23a and a drive-side end 32a, which is rearward of the shaft 32, are inserted into a coupling sleeve 32d, which has a circular-tube shape, and are coupled in a manner capable of transmitting rotational power. A long-shaft-type drive shaft is used as the shaft 32, in which the unit length per unit of diameter (length/diameter) is 10-20. For example, if a length 32j for the diameter 32c of 10 mm is 127 mm, then 127 mm/10 mm [=length 32j/diameter 32c] is 12.7 in such an embodiment. An alloy steel for machine structures, such as chrome-molybdenum steel (SCM material), nickel-chrome-molybdenum steel (SNCM material), or the like, is used as the material. For example, chrome-molybdenum steel is used.

As shown in FIG. 14, the shaft 32 is supported by a third bearing 32g and a fourth bearing 32h such that it is rotatable about motor axis J. An inner ring of the third bearing 32g is press-fitted onto a rear portion of the shaft 32, and an outer ring of the third bearing 32g is press-fitted into a hole part 22d, which is provided at the front end of the shaft-support part 22b. An inner ring of the fourth bearing 32h is press-fitted onto a front portion of the shaft 32, and an outer ring of the fourth bearing 32h is press-fitted into a hole part 33c, which is provided in a shaft-housing coupling part 33a at the rear end of the gear housing 33. The fourth bearing 32h is prevented from coming out of the hole part 33c by a washer 32i. By positioning the second bearing 23f and the third bearing 32g in the hole parts 22c, 22d, which are provided in the front-portion housing 22, the positions of the motor shaft 23a, the shaft 32, and a first intermediate shaft 35 can be set with high accuracy. A drive-side bevel gear 32e is integrally mounted on a follower-side end 32b, which is forward of the shaft 32. A nut 32f for retaining the drive-side bevel gear 32e is mounted forward of the drive-side bevel gear 32e. The drive-side bevel gear 32e enters the gear housing 33.

As shown in FIGS. 14 and 15, the gear housing 33 has a shape such that the shaft-housing coupling part 33a, which is open rearward at the rear end, and a fixed-cover coupling part 33b, which is open leftward at a left-side portion, communicate with each other internally. The gear-housing part 12a of the fixed cover 12 has a shape such that a gear-housing coupling part 12d, which opens rightward at the right end, and an opening into which the output shaft 37 protrudes toward the cutting tool 11, which is leftward, communicate with each other internally. The fixed-cover coupling part 33b is coupled to the gear-housing coupling part 12*d* by a spigot-joint structure, which covers the outer circumference of the gear-housing coupling part 12*d*. The fixed-cover coupling part 33*b* and the gear-housing coupling part 12*d* are coupled by a plurality of fixing screws 33*f* protruding in a direction substantially orthogonal to the side surface of the cutting tool 11.

As shown in FIGS. 14 and 15, the first intermediate shaft 35, a second intermediate shaft 36, and the output shaft 37 are each supported, such that they are rotatable about their respective axes, within the gear housing 33 and the gear-housing part 12*a*. The first intermediate shaft 35, the second intermediate shaft 36, and the output shaft 37 extend in the left-right direction such that their extension directions are orthogonal to the side surface of the cutting tool 11. A bearing box 34 is coupled to the left-side surface of the gear housing 33 by a plurality of fixing screws 34*d* extending in a direction substantially orthogonal to the side surface of the cutting tool 11. The bearing box 34 holds the bearings that support the first intermediate shaft 35, the second intermediate shaft 36, and the output shaft 37.

As shown in FIG. 14, the first intermediate shaft 35 is supported in a rotatable manner by a fifth bearing 35*c* and a sixth bearing 35*d*. An inner ring of the fifth bearing 35*c* is press-fitted onto the right end of the first intermediate shaft 35, and an outer ring of the fifth bearing 35*c* is press-fitted into a hole part 33*d*, which is provided on a right side of the interior of the gear housing 33. An inner ring of the sixth bearing 35*d* is press-fitted onto the left end of the first intermediate shaft 35, and an outer ring of the sixth bearing 35*d* is press-fitted into a hole part 34*a*, which is provided in the bearing box 34. By positioning both the fourth bearing 32*h* and the fifth bearing 35*c* in the hole parts 33*c*, 33*d*, which are provided within the gear housing 33, the positions of the shaft 32 and the first intermediate shaft 35 can be set with high accuracy. Furthermore, the meshing of the drive-side bevel gear 32*e* and a follower-side bevel gear 35*a* can be set with high accuracy.

As shown in FIG. 14, on the right side of the first intermediate shaft 35, the follower-side bevel gear 35*a* is inserted using a transition fit in a manner movable in the axial direction. The follower-side bevel gear 35*a* and the first intermediate shaft 35 are rotationally locked relative to one another by the engagement of a key and a key groove. On the right side of the follower-side bevel gear 35*a*, a washer 35*e*, which is made of steel, a rubber ring 35*f*, and a washer 35*g*, which is made of steel, are mounted on the first intermediate shaft 35. A ring stop 35*h* is mounted, such that it becomes sandwiched in the axial direction, on the rubber ring 35*f*, which is sandwiched by the washers 35*e*, 35*g*. The rubber ring 35*f* cushions impacts, vibration, etc. between the first intermediate shaft 35 and the follower-side bevel gear 35*a*. The follower-side bevel gear 35*a* meshes with the drive-side bevel gear 32*e*. The rotational output of the shaft 32 is reduced in speed, converted such that its rotational direction is substantially vertical, and transmitted to the first intermediate shaft 35 via the meshing between the drive-side bevel gear 32*e* and the follower-side bevel gear 35*a*. A reduction gear 35*b* is formed, as a component integral with the first intermediate shaft 35, between the follower-side bevel gear 35*a* and the sixth bearing 35*d* in the left-right direction.

As shown in FIG. 15, the second intermediate shaft 36 is supported in a rotatable manner by a seventh bearing 36*b* and an eighth bearing 36*c*. An inner ring of the seventh bearing 36*b* is press-fitted onto the right end of the second intermediate shaft 36, and an outer ring of the seventh bearing 36*b* is press-fitted into a hole part 12*b*, which is provided on a right side of the interior of the gear-housing part 12*a*. An inner ring of the eighth bearing 36*c* is press-fitted onto the left end of the second intermediate shaft 36, and an outer ring of the eighth bearing 36*c* is press-fitted into a hole part 34*b*, which is provided in the bearing box 34. A reduction gear 36*a* is formed, as a component integral with the second intermediate shaft 36, between the seventh bearing 36*b* and the eighth bearing 36*c* in the left-right direction. The reduction gear 36*a* meshes with the reduction gear 35*b*. The rotational output of the first intermediate shaft 35 is reduced in speed and transmitted to the second intermediate shaft 36 via the meshing between the reduction gear 35*b* and the reduction gear 36*a*.

As shown in FIG. 15, the output shaft 37 is supported in a rotatable manner by a ninth bearing 37*b* and a tenth bearing 37*c*. An inner ring of the ninth bearing 37*b* is press-fitted onto the right end of the output shaft 37, and an outer ring of the ninth bearing 37*b* is press-fitted into a hole part 12*c*, which is provided on a right side of the interior of the gear-housing part 12*a*. An inner ring of the tenth bearing 37*c* is press-fitted onto a center portion of the output shaft 37, and an outer ring of the tenth bearing 37*c* is press-fitted into a hole part 34*c*, which is provided in the bearing box 34. A reduction gear 37*a* is formed, as a component integral with the output shaft 37, between the ninth bearing 37*b* and the tenth bearing 37*c* in the left-right direction. The reduction gear 37*a* meshes with the reduction gear 36*a*. The rotational power of the second intermediate shaft 36 is reduced in speed and transmitted to the output shaft 37 via the meshing between the reduction gear 36*a* and the reduction gear 37*a*. Thus, owing to the rotational output of the motor shaft 23*a* (refer to FIG. 14) being reduced in speed and being transmitted to the output shaft 37, the cutting tool 11 rotates.

As shown in FIGS. 4-7, when the cutting tool 11 is vertical, regardless of where the cutting-machine main body 10 is located between the top dead center and the bottom dead center, the electric motor 23 is located more upward than the first bar 51*a*. More specifically, when the cutting tool 11 is in the vertical state and the cutting-machine main body 10 is located at the top dead center, the shaft 32 is located more upward than the first bar 51*a*. Moreover, even when the cutting tool 11 is in the vertical state and the cutting-machine main body 10 is located at the bottom dead center, the shaft 32 still overlaps the slide bars 51 in the up-down direction. When the cutting tool 11 is vertical and the cutting-machine main body 10 is located at the top dead center, the motor shaft 23*a* preferably is tilted (inclined) in the range of −10° to 0° to 10° relative to the horizontal plane (when the side opposite to the gear of the motor shaft 23*a* is tilted downward relative to the horizontal plane (0°), it is indicated as being set to minus, and when tilted upward, it is indicated as being set to plus). In the present Working Example 1, when the cutting-machine main body is located at the top dead center, the motor shaft 23*a* is parallel to the horizontal plane. When the cutting-machine main body 10 is located at the top dead center, the entire motor shaft 23*a* is located more rearward than the up-down swing shaft 10*a*.

Figure 6:
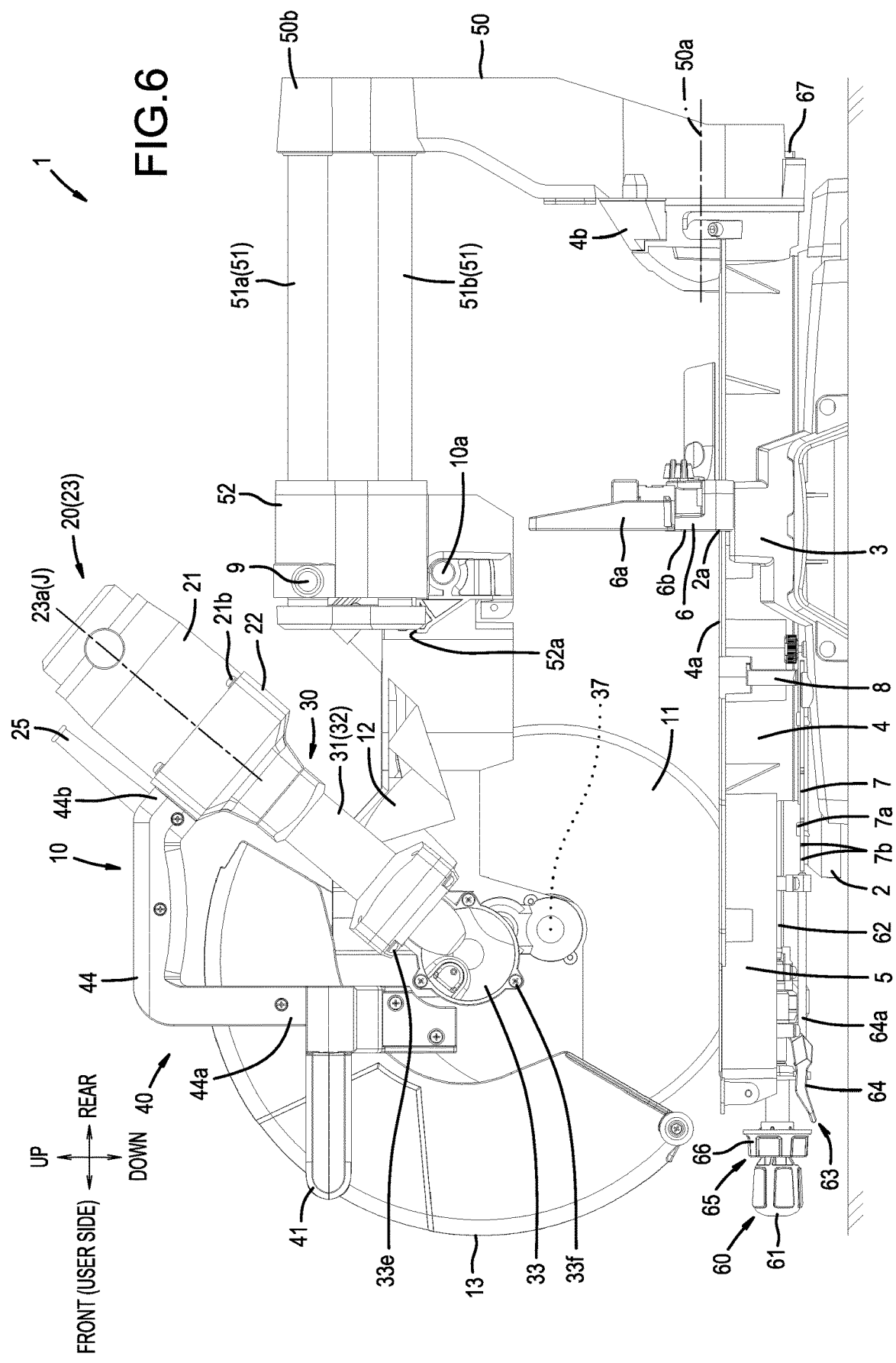
FIG. 6 is a right view of the sliding cutting machine in the state in which the cutting-machine main body is located at the bottom dead center.

As shown in FIG. 6, when the cutting-machine main body 10 is located at the bottom dead center, the side opposite to the gear of the motor shaft 23*a* is tilted upward as it goes (extends) rearward. The tilt angle thereof is 40° relative to the horizontal plane. When the cutting tool 11 is vertical and the cutting-machine main body 10 is located at the bottom dead center, the motor shaft 23*a* is tilted in the range of 30°-60° relative to the horizontal plane and more preferably is tilted in the range of 35°-45°. Consequently, the electric motor 23 is provided such that it is compact in the up-down direction, even when the cutting-machine main body 10 is located at the bottom dead center. When the cutting-machine main body 10 is located at the bottom dead center, the entire motor shaft 23a is located more forward than the up-down swing (pivot) shaft 10a.

As shown in FIGS. 8, 10 and 14, the motor shaft 23a extends parallel to the side surface of the cutting tool 11. The angle formed by the motor shaft 23a with the side surface of the cutting tool 11 preferably is −10° to 0° to 10° when viewed from the extension direction of the cutting tool 11 and the radial direction of the motor shaft 23a (when the side opposite of the gear of the motor shaft 23a is tilted leftward relative to parallel (0°) to the cutting tool, it is indicated as being set to minus, and when tilted rightward, it is indicated as being set to plus). If the angle is within this angular range, then it suffices merely to change the axial angle between the drive-side bevel gear 32e and the follower-side bevel gear 35a, which mesh with each other, and therefore there is no need for a major change in the design concept, such as the addition of one or more other components.

As shown in FIG. 10, when the cutting tool 11 is vertical and the cutting-machine main body 10 is located at the top dead center, the motor shaft 23a, which is the center of the electric motor 23, is located rightward of the cutting tool 11 and is located leftward of the slide bars 51. The motor shaft 23a preferably is disposed at a location that is 30%-50% of the distance from first virtual plane S1 to second virtual plane S2 rightward in the surface-normal direction of the cutting tool 11, with first virtual plane S1 serving as the starting point, and for example is disposed at a location that is 43% of that distance. The distance from first virtual plane S1 to motor shaft 23a is, for example, 56.2 mm. That is, if the distance from first virtual plane S1 to second virtual plane S2 is 132 mm, then 56.2 mm/132 mm=43%.

As shown in FIGS. 8 and 10, the cutting-machine main body 10 comprises a handle part 40, which is more rightward than the side surface of the cutting tool 11 and is forward of the gear housing 33 when the cutting tool 11 is vertical. A manipulatable handle 41, which has a loop shape and extends in the left-right direction substantially orthogonal to the side surface of the cutting tool 11, is provided at a front portion of the handle part 40. A switch lever 42 is provided on an inner-circumference side of the manipulatable handle 41. When the user grasps the manipulatable handle 41, the user can pull the switch lever 42 with his/her finger. When the switch lever 42 is pulled, the electric motor 23 starts, and the cutting tool 11 rotates. A lock-off button 43 is provided on a front surface of the manipulatable handle 41. By pushing the lock-off button 43, it becomes possible to manually pull the switch lever 42 to energize the electric motor 23. Thereby, an unintentional starting of the electric motor 23 is avoided.

As shown in FIG. 10, when the cutting tool 11 is vertical and the cutting-machine main body 10 is located at the top dead center, a center 41a of the manipulatable handle 41 in the left-right direction is located between first virtual plane S1 and second virtual plane S2 in the left-right direction. The center 41a is preferably disposed at a location that is 30%-70% of the distance from first virtual plane S1 to second virtual plane S2 rightward in the surface-normal direction of first virtual plane S1, with first virtual plane S1 as the starting point, and for example is disposed at a location that is 70% of that distance. The distance from first virtual plane S1 to the center 41a is, for example, 92 mm. That is, if the distance from first virtual plane S1 to second virtual plane S2 is 132 mm, then 92 mm/132 mm=70%.

As shown in FIGS. 4, 5 and 8, the handle part 40 comprises a carrying handle 44, which is rearward of the manipulatable handle 41. The carrying handle 44 has a loop shape, which has a first coupling part 44a at one end and a second coupling part 44b at the other end. The first coupling part 44a is coupled to a rear portion of the manipulatable handle 41, which extends rightward of the fixed cover 12. The second coupling part 44b is coupled to an upper portion of the front-portion housing 22. When the cutting tool is vertical, the carrying handle 44 extends along the motor shaft 23a in the front-rear direction. When the cutting-machine main body 10 has been moved to the bottom dead center, the carrying handle 44 extends substantially in the horizontal direction. When the cutting-machine main body 10 has been locked at the bottom dead center by the bottom-dead-center lock pin 19, the user can carry the sliding cutting machine 1 by grasping the carrying handle 44.

As shown in FIGS. 1, 4, a turntable-fixing mechanism (miter angle setting mechanism) 60 is provided at a lower portion of the table-extension part 5. A grip (knob) 61 is provided at a front portion of the table-extension part 5. The grip 61 has a concave-convex (ridged) shape on (around) a circumferential edge (circumferential surface) thereof so that the user can easily grasp and rotate the grip 61. In addition, the user can grasp the grip 61 and rotate (pivot) the turntable 4 in the horizontal direction about the turntable center relative to the base 2. A fixing rod 62 extends in the front-rear direction rearward from the grip 61 in the interior of the table-extension part 5. The fixing rod 62 is supported, by threaded engagement, in the interior of the table-extension part 5. The grip 61 is rotatable about its longitudinal axis, using the fixing rod 62 as the axial center. When the grip 61 is manually rotated about the axis of the fixing rod 62, the fixing rod 62 displaces (moves forward or rearward depending on the direction of rotation of the grip 61) in the front-rear direction (along the extension direction of the slide bars 51a, 51b). By displacing the fixing rod 62 rearward and causing the rear end to engage with the base 2, the turntable 4 can be positioned (fixed) at any arbitrary miter angle relative to the base 2. By displacing the fixing rod 62 forward, the positioning (fixing, latching) of the turntable 4 at the arbitrary miter angle can be released.

As shown in FIGS. 4 and 5, a positive-lock mechanism 63 is provided on a lower portion of the table-extension part 5. By using the positive-lock mechanism 63, the turntable 4 can be positioned (fixed) at one of the prescribed (predetermined) miter angles that respectively correspond to the positioning recesses 7b provided in the miter scale plate 7. A lock-release lever 64 and the positioning pin 64a are provided on the positive-lock mechanism 63. The lock-release lever 64 is provided more rearward and more downward than the grip 61 at a front portion of the table-extension part 5. The positioning pin 64a extends in the front-rear direction along the longitudinal direction of the table-extension part at a lower portion of the table-extension part 5. The positioning pin 64a is provided at substantially the same height as the miter scale plate 7. The rear end of the positioning pin 64a is configured/adapted to enter and engage any one of the positioning recesses 7b by being displaced rearward. In addition, the rear end of the positioning pin 64a is configured/adapted to disengage from the positioning recesses 7b by being displaced forward.

A front portion of the positioning pin 64a shown in FIGS. 4 and 5 is coupled to the lock-release lever 64. When the lock-release lever 64 is pressed downward, the positioning pin 64a displaces forward. The rear end of the positioning pin 64a, which has displaced forward, disengages from the positioning recesses 7b. Consequently, when the positioning (fixing) of the turntable 4 is released by manually rotating the grip 61, the turntable 4 can be rotated (pivoted) freely in the left-right direction (in the horizontal plane). When the lock-release lever 64 is lifted upward, the positioning pin 64a displaces rearward. The rear end of the positioning pin 64a makes contact with (abuts) an outer-circumferential edge of the miter scale plate 7. When the grip 61 is grasped and the turntable 4 is caused to rotate (pivot) in the horizontal direction (plane), the positioning pin 64a enters one of the positioning recesses 7b, which are provided on the outer-circumferential edge of the miter scale plate 7. Thus, the turntable 4 can be positioned (fixed) at any one of the prescribed (predetermined, factory-set) miter angle positions that respectively correspond to the positioning recesses 7b.

As shown in FIGS. 4 and 5, a tilt-fixing mechanism (bevel angle setting mechanism) 65, which positions and holds the main-body support arm 50 such that it is tiltable in the left-right direction, is provided on a front portion of the table-extension part 5. The tilt-fixing mechanism 65 comprises a tilt-fixing manipulatable part (rotatable collar) 66 and a transmission shaft 66a (refer to FIG. 13). The tilt-fixing manipulatable part 66 is provided between the grip 61 and the front end of the table-extension part 5. The tilt-fixing manipulatable part 66 can be rotated about its longitudinal axis coaxially with the grip 61. The tilt-fixing manipulatable part 66 comprises a concave-convex shape, the pattern of which differs from the concave-convex shape of the grip 61, on its circumferential edge such that the user can easily distinguish between the two, in order to selectively grasp and rotate the tilt-fixing manipulatable part 66. That is, when the user grasps the tilt-fixing mechanism 65, the user can easily distinguish (n a tactile manner) between the tilt-fixing manipulatable part 66 and the grip 61, and thereby reducing the likelihood of inappropriate or unintended manipulation of the wrong part.

When the tilt-fixing manipulatable part 66 shown in FIGS. 4 and 5 is rotated, the transmission shaft 66a (refer to FIG. 13) rotates about its longitudinal axis. The transmission shaft 66a extends in the front-rear direction along the longitudinal direction of the table-extension part 5 up to a lower portion of the main-body support arm 50. A receiving part 67, which is movable along a slot 67a (refer to FIG. 13) extending in an arcuate shape about the left-right tilting pivot 50a, is provided at a lower portion of the main-body support arm 50. The receiving part 67 is screw-coupled to the rear end of the transmission shaft 66a. Rotation of the receiving part 67 about the axis of the transmission shaft 66a is restricted by the side surface of the slot 67a. Consequently, when the tilt-fixing manipulatable part 66 is rotated in the tightening direction, an axial force is created by the transmission shaft 66a between the main-body support arm 50 and the arm-support part 4b. Consequently, the main-body support arm 50 and the arm-support part 4b are pressed in the front-rear direction, and thereby the main-body support arm 50 is fixed at an arbitrary left-right tilt (bevel) angle relative to the arm-support part 4b. When the tilt-fixing manipulatable part 66 is rotated in the loosening direction, the axial force of the transmission shaft 66a is released. Consequently, the main-body support arm 50 becomes tiltable in the left-right direction about the left-right tilting pivot 50a.

The sliding cutting machine 1 as described above comprises the slide bars 51, which are elongate and extend in the front-rear direction as shown in FIGS. 4 and 10. The sliding cutting machine 1 comprises the slide base 52, which is mounted on the slide bars 51 and slides along the slide bars 51 in the front-rear direction. The sliding cutting machine 1 comprises the cutting-machine main body 10, which is mounted such that it is swingable (pivotable) in the up-down direction about the up-down swing shaft 10a provided on the slide base 52. The cutting-machine main body 10 comprises the output shaft 37, which extends in the axial direction orthogonal to the slide bars 51 and on which the cutting tool 11 is mounted. The cutting-machine main body 10 comprises the electric motor 23, which is the motive-power source that drives the output shaft 37, is provided between the cutting tool 11 and the slide bars 51, when viewed from the front, in the state in which the cutting tool 11 is vertical, and is located more upward than the slide bars 51. The cutting-machine main body comprises the motive-power transmitting part 30, which transmits the driving force of the motor shaft 23a of the electric motor 23 to the output shaft 37. The motive-power transmitting part 30 is provided between the cutting tool 11 and the slide bars 51 when viewed from the front and is located more upward than the slide bars 51 when the cutting-machine main body 10 is located at top dead center.

Thus, by providing the motive-power transmitting part 30 between the electric motor 23 and the output shaft 37 in Working Example 1, the electric motor 23 is always disposed more upward than the slide bars 51 regardless of where the cutting-machine main body 10 is located between the top dead center and the bottom dead center. Consequently, the cutting tool 11 can be disposed more proximate to the slide bars 51. Thereby, even when the cutting-machine main body 10 is located at the top dead center, the electric motor 23 and the motive-power transmitting part 30 are located more upward than the slide bars 51.

Consequently, when the cutting-machine main body 10 is located at the top dead center, the visibility of the cutting-in position of the cutting tool 11 is satisfactory.

Figure 7:
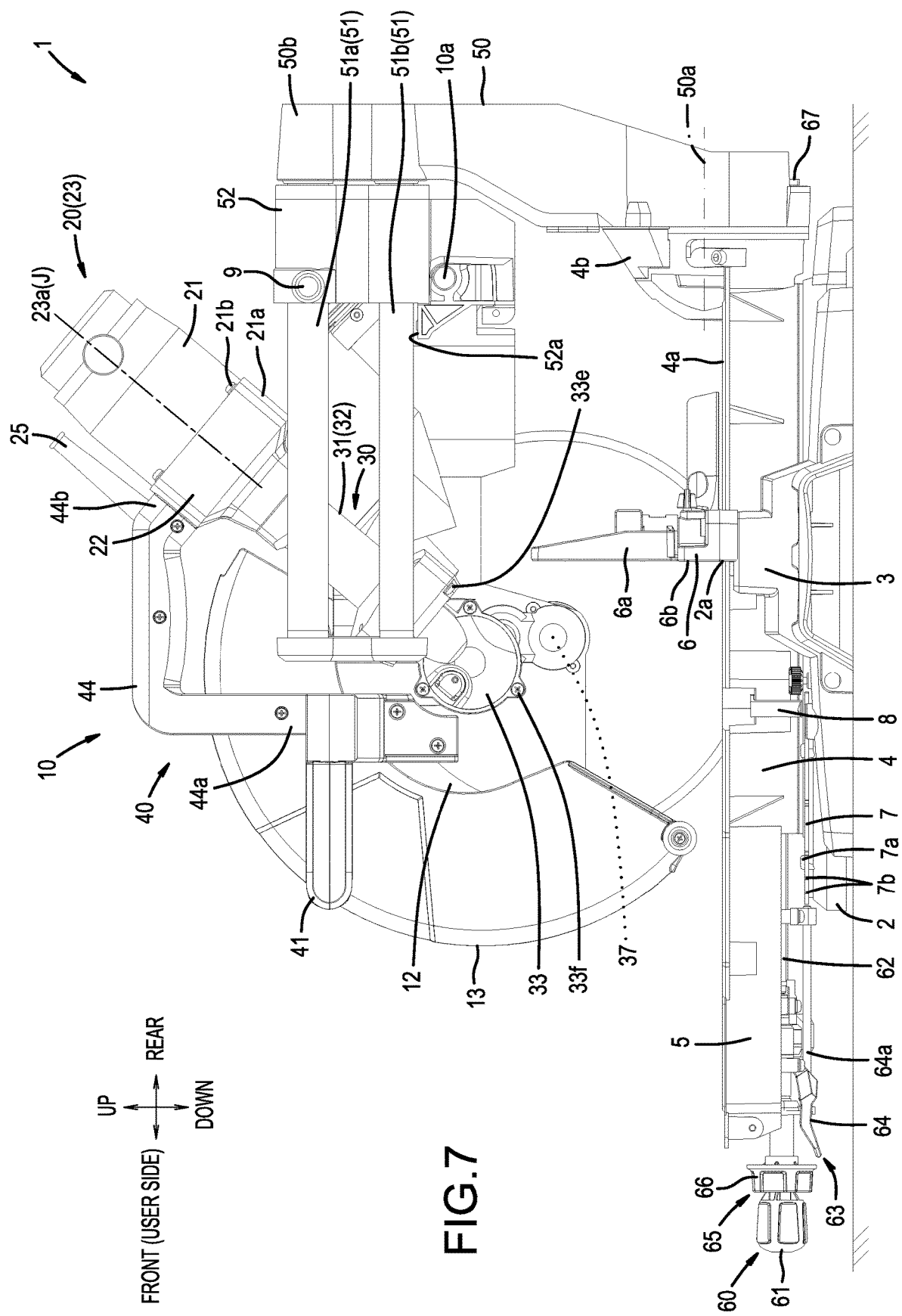
FIG. 7 is a right view of the sliding cutting machine in the state in which the cutting-machine main body is located at the bottom dead center and located at the rear end.

As shown in FIGS. 7 and 14, the motive-power transmitting part 30 comprises the shaft 32, which transmits the driving force from the motor shaft 23a to the output shaft 37. The shaft 32 intersects the slide bars 51 when viewed from the axial direction and the cutting-machine main body 10 is located at the bottom dead center. Accordingly, the shaft 32 is disposed between the cutting tool 11 and the slide bars 51 when viewed from the near side and the cutting-machine main body 10 is located at the bottom dead center. Thus, the electric motor 23 is disposed upward of the shaft 32 and more upward than the slide bars 51 without directly contacting the slide bars 51. Consequently, the distance between the cutting tool 11 and the slide bars 51 in the axial direction of the output shaft 37 can be decreased. Thereby, the machine rigidity of the cutting-machine main body 10 can be maintained at a high level, and a decrease in the cutting accuracy of the cutting tool 11 can be avoided.

As shown in FIG. 14, the diameter 32c of the shaft 32 is $\frac{1}{40}$-$\frac{1}{20}$ of the (outer) diameter 11a of the cutting tool 11. Accordingly, a shaft 32 having the strength needed to support the electric motor 23 can be provided, and the distance between the cutting tool 11 and the slide bars 51 in the axial direction of the output shaft 37 can be decreased.

As shown in FIGS. 4, 14, the shaft housing 31, which has a tube shape and houses the shaft 32, is provided. The shaft housing 31 comprises the gear-housing coupling part 31b, which widens in the radial direction of the shaft 32 over the range of the follower-side end of the shaft 32 coupled to the output shaft 37. Accordingly, the shaft housing 31 can be screwed in the axial direction onto the gear housing 33 on the output shaft 37 side. Consequently, the sliding cutting device can be assembled in a satisfactory manner, and the support rigidity of the shaft housing 31 can be made high.

As shown in FIG. 10, the distance in the axial direction of the output shaft 37 from the cutting tool 11 to the slide bars 51 is ¾ or less of the diameter 11a of the cutting tool 11. Accordingly, the distance from the cutting tool 11 to the slide bars 51 in the axial direction of the output shaft 37 can be set to the required minimum, and the machine rigidity of the cutting-machine main body 10, which is supported on the slide bars 51, can be increased. Consequently, when the cutting tool 11 is caused to cut into the workpiece, shaking of the cutting tool 11 in the axial direction of the output shaft 37 can be curtailed.

As shown in FIGS. 5-7, when the cutting-machine main body 10 is located at the bottom dead center, the entire electric motor 23 is located between the output shaft 37 and the up-down swing shaft 10a in the front-rear direction (along the extension direction of the slide bars 51a, 51b). Accordingly, the center of gravity of the cutting-machine main body 10, which is located at the bottom dead center, can be brought more proximate to the up-down swing shaft 10a. Consequently, fluctuations in the load when the cutting-machine main body swings up and down can be decreased. Furthermore, the cutting-machine main body 10 is biased from the bottom dead center toward the top dead center by a torsion spring, which is mounted around the up-down swing shaft 10a. By decreasing fluctuations in the load of the cutting-machine main body 10, the spring load of the torsion spring can be decreased. In addition, the machine rigidity of the cutting-machine main body 10, in which the up-down swing shaft 10a is the center, can be increased.

As shown in FIG. 4, when the cutting-machine main body 10 is located at the top dead center, the entire electric motor 23 is located more rearward than the up-down swing shaft 10a. Consequently, the cutting-machine main body 10 can be swung upward using the load of the electric motor 23 and returned to the top dead center. Consequently, the spring load of the torsion spring, which biases the cutting-machine main body 10 toward top dead center, can be decreased.

As shown in FIGS. 10 and 14, the motor shaft 23a is parallel to the side surface of the cutting tool 11 when viewed from the radial direction of the motor shaft 23a in the state in which the cutting tool 11 is vertical or is tilted (inclined) by 10° or less relative to the side surface. Accordingly, the motor shaft 23a can be disposed with an attitude that follows the side surface of the cutting tool 11. Consequently, the electric motor 23 can be disposed more proximate to the cutting tool 11 in the axial direction of the output shaft 37. Thereby, the cutting-machine main body 10 can be made more compact in the axial direction of the output shaft 37.

As shown in FIG. 10, the motor shaft 23a, which is the center of the electric motor 23, is disposed at a location that is 30%-50% of the distance from the cutting tool 11 to the slide bars 51 in the surface-normal direction of the cutting tool 11 with the cutting tool 11 as the starting point. Accordingly, the motor shaft 23a is disposed at a location that is more proximate to the cutting tool 11 than to the slide bars 51. Consequently, the center of gravity of the cutting-machine main body 10 can be brought more proximate to the cutting tool 11 in the axial direction of the output shaft 37. Thereby, when the cutting-machine main body 10 is moved downward and the cutting tool 11 is caused to cut into the workpiece, the twisting moment due to the reaction force that the cutting tool 11 receives from the workpiece and due to the intrinsic weight of the cutting-machine main body 10 can be decreased.

As shown in FIGS. 10 and 14, the electric motor 23 is a brushed motor that operates using electric power supplied from an AC power supply. Accordingly, even in an embodiment in which a brushed motor having a comparatively large motor diameter is utilized, it is possible to reduce hindrance to visibility by the brushed motor when confirming the cutting-in position of the cutting tool 11. In addition, even though a (comparatively large) brushed motor is utilized, the distance between the cutting tool 11 and the slide bars 51 in the axial direction of the output shaft 37 can be decreased.

As shown in FIG. 4, the slide bars 51 comprise the plurality of slide bars provided in parallel. The plurality of slide bars includes the first slide bar 51a, which is located most upward, and the second slide bar 51b, which is located most downward. When the (outer) diameter 51e of the first slide bar 51a is given as a [mm], the (outer) diameter 51f of the second slide bar 51b is given as b [mm], the center-to-center distance 51g between the first slide bar 51a and the second slide bar 51b is given as c [mm], and the (outer) diameter 11a of the cutting tool 11 is given as d [mm], the following relationship is satisfied: $(a/2+b/2+c) \times 2 < d < (a/2+b/2+c) \times 3.5$. Accordingly, the plurality of slide bars can fit compactly within the range of a length that is shorter than half the (outer) diameter 11a of the cutting tool 11 in the up-down direction. Moreover, the distance in the up-down direction, including all of the plurality of slide bars, is larger than 2/7 times the (outer) diameter 11a of the cutting tool 11. Consequently, the plurality of slide bars can be provided such that they have sufficient strength to be able to support the cutting-machine main body 10. Thus, it is possible to achieve both compactness and sufficient support strength of the slide structure of the cutting-machine main body 10.

As shown in FIGS. 5-7, the motor shaft 23a is oriented such that, when the cutting-machine main body 10 is located at the bottom dead center, the motor shaft 23a has (assumes) a tilt angle such that it tilts upward as it goes (extends) rearward. Accordingly, the amount by which the electric motor 23 protrudes downward when the cutting-machine main body 10 is located at the bottom dead center can be curtailed to the minimum. Thereby, the sliding cutting machine 1 can be made more compact in the up-down direction.

As shown in FIGS. 5-7, the tilt angle of the motor shaft 23a is 30°-60° relative to the horizontal when the cutting-machine main body 10 is located at the bottom dead center. Accordingly, the motor housing 20, which houses the electric motor 23, can be prevented from making contact with the workpiece. Consequently, the workpiece can be suitably cut using the compactly provided sliding cutting machine 1.

As shown in FIG. 4, when the cutting-machine main body 10 is located at the top dead center, the motor shaft 23a is parallel to the horizontal or has (assumes) a tilt angle that is 10° or less relative to the horizontal. Accordingly, the amount by which the electric motor 23 protrudes upward and downward can be curtailed. Consequently, when confirming the cutting-in position of the cutting tool 11, hindrance to visibility can be prevented.

As shown in FIGS. 8 and 10, the sliding cutting machine 1 comprises the manipulatable handle 41, which is used when manually moving (sliding and/or pivoting) the cutting-machine main body 10 relative to the slide bars 51. When the cutting tool 11 is vertical, the center 41a of the manipulatable handle 41 is located along a virtual plane that includes the cutting tool 11 when viewed from the front and is located between the slide bars 51 and the cutting tool 11. Accordingly, the slide bars 51 and the center 41a of the manipulatable handle 41 can be made more proximate in the axial direction of the output shaft 37. Consequently, when the user grasps the manipulatable handle 41 and causes the cutting tool 11 to cut into the workpiece, the twisting moment of the cutting-machine main body 10 relative to the slide bars 51 can be decreased. Furthermore, the cutting tool 11 and the center 41a of the manipulatable handle 41 can be made more proximate in the axial direction of the output shaft 37. Consequently, when the user grasps the manipulatable handle 41 and causes the cutting tool 11 to cut into the workpiece, the twisting moment due to the reaction force received by the cutting tool 11 from the workpiece and by the manipulation force with which the manipulatable handle 41 is manipulated can be decreased.

As shown in FIG. 10, the center 41a of the manipulatable handle 41 is disposed at a location that is 30%-70% of the distance from the cutting tool 11 to the slide bars 51 in the axial direction with the cutting tool 11 as the starting point. Accordingly, the center 41a of the manipulatable handle 41 is disposed at a location at which it is not spaced too far apart from both the cutting tool 11 and the slide bars 51. Consequently, the twisting moment of the cutting-machine main body 10 that acts between the cutting tool 11 and the manipulatable handle 41 can be decreased. Moreover, flexure of the slide bars 51 due to the manipulation force with which the manipulatable handle 41 is manipulated can be curtailed.

As shown in FIG. 13, the sliding cutting machine 1 comprises the bottom-dead-center stopper 17, which restricts (blocks) movement of the cutting-machine main body to below the bottom dead center. When the cutting tool 11 is vertical, the center 17a of the bottom-dead-center stopper 17 is located between the slide bars 51 and the cutting tool 11 when viewed from the front. Accordingly, the distance between the center 17a of the bottom-dead-center stopper 17 and the slide bars 51 in the axial direction of the output shaft 37 can be decreased. The bottom-dead-center stopper 17 receives a reaction force when the cutting-machine main body 10 is lowered to the bottom dead center. Consequently, by decreasing this distance, the twisting moment of the cutting-machine main body 10 relative to the slide bars 51 due to the reaction force can be decreased.

As shown in FIG. 13, the center 17a of the bottom-dead-center stopper 17 is disposed at a location that is 30%-70% of the distance from the cutting tool 11 to the slide bars 51 in the axial direction, with the cutting tool 11 serving as the starting point. Accordingly, the center 17a of the bottom-dead-center stopper 17 is disposed at a location at which it is not spaced too far apart from both the cutting tool 11 and the slide bars 51. Consequently, the reaction force received by the bottom-dead-center stopper 17 and the twisting moment of the cutting-machine main body 10 that acts between the slide bars 51 and the cutting-machine main body 10 can be decreased, and shaking of the cutting tool 11 due to the twisting moment can be curtailed.

Next, Working Example 2 of the present disclosure will be explained, with reference to FIGS. 16-21. Sliding cutting machine 70 comprises a cutting-machine main body 71 instead of the cutting-machine main body 10 of the sliding cutting machine 1 shown in FIG. 1. The cutting-machine main body 71 is supported such that it is swingable (pivotable) in the up-down direction relative to the slide base 52 about an up-down swing shaft (pivot shaft) 71a, which is located rearward of the cutting tool 11. A motor housing 73, which houses an electric motor 74, and a battery-mount part 78, on which a rechargeable battery 79 is mountable, are provided on the cutting-machine main body 10.

Figure 16:
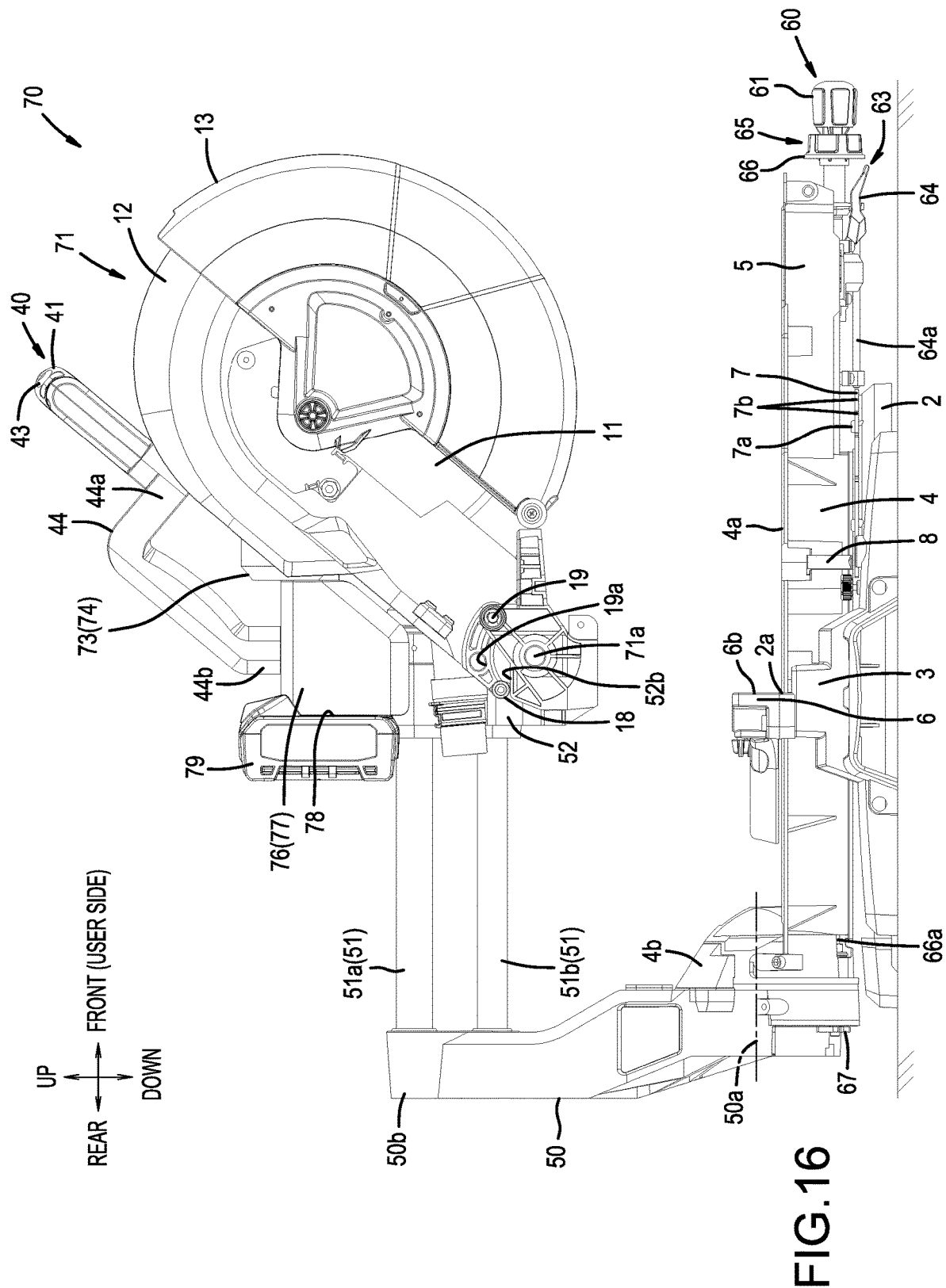
FIG. 16 is a left view that shows the state in which the cutting-machine main body of the sliding cutting machine is located at the top dead center according to Working Example 2 of the present disclosure.
Figure 20:
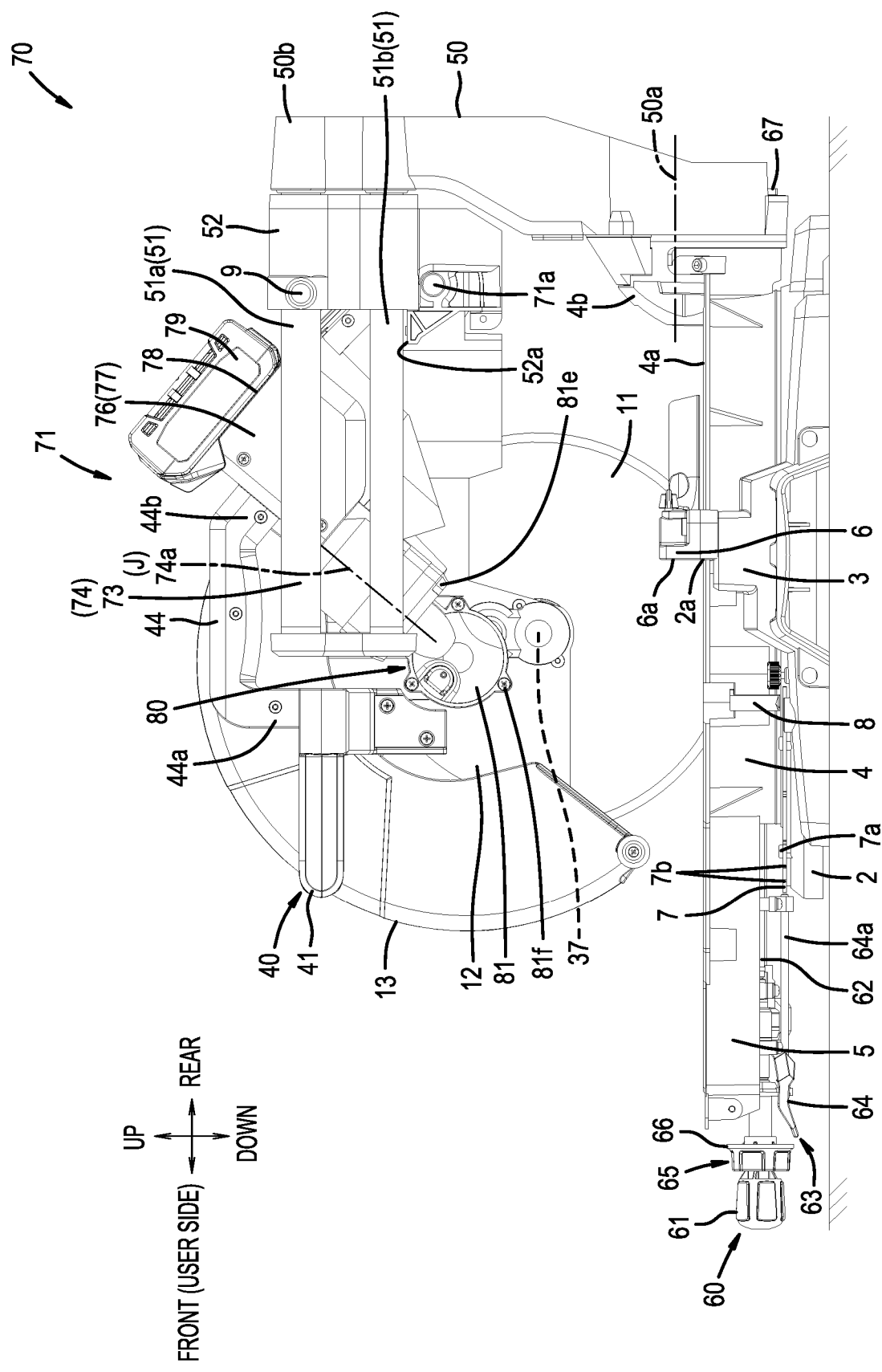
FIG. 20 is a right view of the sliding cutting machine in the state in which the cutting-machine main body is located at the bottom dead center and located at the rear end.

As shown in FIGS. 16 and 20, the motor housing 73 is provided between the cutting tool 11 and the slide bars 51 in the left-right direction. The motor housing 73 is substantially circular-tube shaped and extends in the front-rear direction. A DC brushless motor, which runs on electric power supplied from a DC power supply, such as, for example, the battery 79, is used as the electric motor 74. A motor shaft 74a is provided at the center of the electric motor 74. The motor shaft 74a extends in the front-rear direction along motor axis J parallel to the side surface of the cutting tool 11. The extension direction and the location in the left-right direction of motor axis J between the cutting tool 11 and the slide bars 51 are substantially the same as those of motor axis J shown in FIG. 10.

Figure 21:
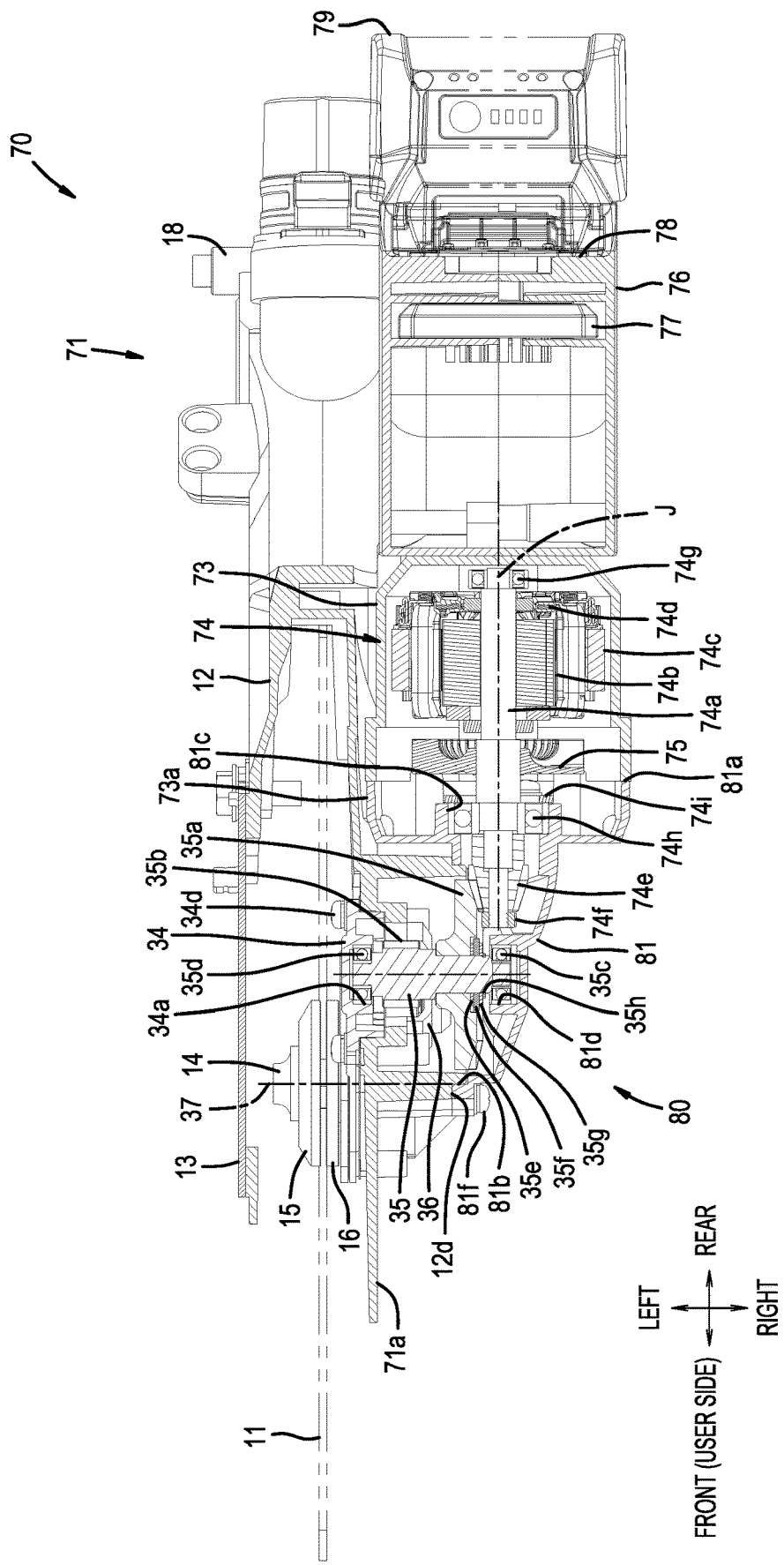
FIG. 21 is a cross-sectional auxiliary view taken along line XXI-XXI in FIG. 17.

As shown in FIG. 21, the motor shaft 74a is supported by a first bearing 74g and a second bearing 74h such that it is rotatable about motor axis J. An inner ring of the first bearing 74g is press-fitted onto the rear end of the motor shaft 74a, and an outer ring of the first bearing 74g is press-fitted into a hole part, which is provided at the inner-side rear end of the motor housing 73. An inner ring of the second bearing 74h is press-fitted onto a front portion of the motor shaft 74a, and an outer ring of the second bearing 74h is press-fitted into a hole part 81c, which is provided at the rear end of a gear housing 81 described below. The second bearing 74h is prevented from coming out of the hole part 81c by a washer 74i.

As shown in FIG. 21, a stator 74c of the electric motor 74 is supported in a non-rotatable manner on (by) an inner-circumferential surface of the motor housing 73. A rotor 74b of the electric motor 74 is disposed in the interior of the stator 74c. The rotor 74b is mounted along an outer circumference of the motor shaft 74a and is capable of rotating together with the motor shaft 74a. A sensor board 74d for detecting the rotational angle of the rotor 74b is provided rearward of the rotor 74b. A fan 75 for introducing a cooling draft into the interior of the motor housing 73 is integrally mounted between the rotor 74b and the second bearing 74h in the front-rear direction at a front portion of the motor shaft 74a. When the electric motor 74 is caused to operate and the fan 75 rotates, a cooling draft flows forward from a rear portion of the motor housing 73.

As shown in FIG. 20, the cutting-machine main body 71 comprises a motive-power transmitting part 80, which transmits the driving force of the motor shaft 74a to the output shaft 37, between the cutting tool 11 and the slide bars 51 in the left-right direction. The motive-power transmitting part 80 is housed in the gear housing 81 and the gear-housing part 12a, which is provided on a right-side portion of the fixed cover 12. The gear housing 81 couples an opening at the front end of the motor housing 73 and an opening at the right end of the gear-housing part 12a.

As shown in FIG. 21, the gear housing 81 has a shape such that a motor-housing coupling part 81a, which is open rearward at the rear end, and a fixed-cover coupling part 81b, which is open leftward at a left-side portion, communicate with each other internally. A front end 73a of the motor housing 73 and the motor-housing coupling part 81a at the rear end of the gear housing 81 are coupled by a plurality of fixing screws 81e (refer to FIG. 17) protruding along the direction of motor axis J. A drive-side bevel gear 74e is integrally mounted on the front end of the motor shaft 74a. A nut 74f for retaining the drive-side bevel gear 74e is mounted forward of the drive-side bevel gear 74e. The drive-side bevel gear 74e is arranged within the gear housing 81.

As shown in FIG. 21, the fixed-cover coupling part 81b is coupled to the gear-housing coupling part 12d by a spigot-joint structure, which covers the outer circumference of the gear-housing coupling part 12d. The fixed-cover coupling part 81b and the gear-housing coupling part 12d are coupled by a plurality of fixing screws 81f extending in a direction substantially orthogonal to the side surface of the cutting tool 11. The first intermediate shaft 35, the second intermediate shaft 36, and the output shaft 37 are each supported, such that they are rotatable about their respective axes extending in the left-right direction, within the gear housing 81 and the gear-housing part 12a. The bearing box 34 is coupled to the left-side surface of the gear housing 81 by the plurality of fixing screws 34d extending in a direction substantially orthogonal to the side surface of the cutting tool 11.

As shown in FIG. 21, a hole part 81d is provided on the right side of the interior of the gear housing 81. The outer ring of the fifth bearing 35c, which has been press-fitted onto the right end of the first intermediate shaft 35, is press-fitted into the hole part 81d. The follower-side bevel gear 35a, which is mounted on the right side of the first intermediate shaft 35, meshes with the drive-side bevel gear 74e of the motor shaft 74a. By positioning the second bearing 74h and the fifth bearing 35c in the hole parts 81c, 81d, which are provided within the gear housing 81, the positions of the motor shaft 74a and the first intermediate shaft 35 can be set with high accuracy. Furthermore, the meshing between the drive-side bevel gear 74e and the follower-side bevel gear 35a can be set with high accuracy.

Figure 17:
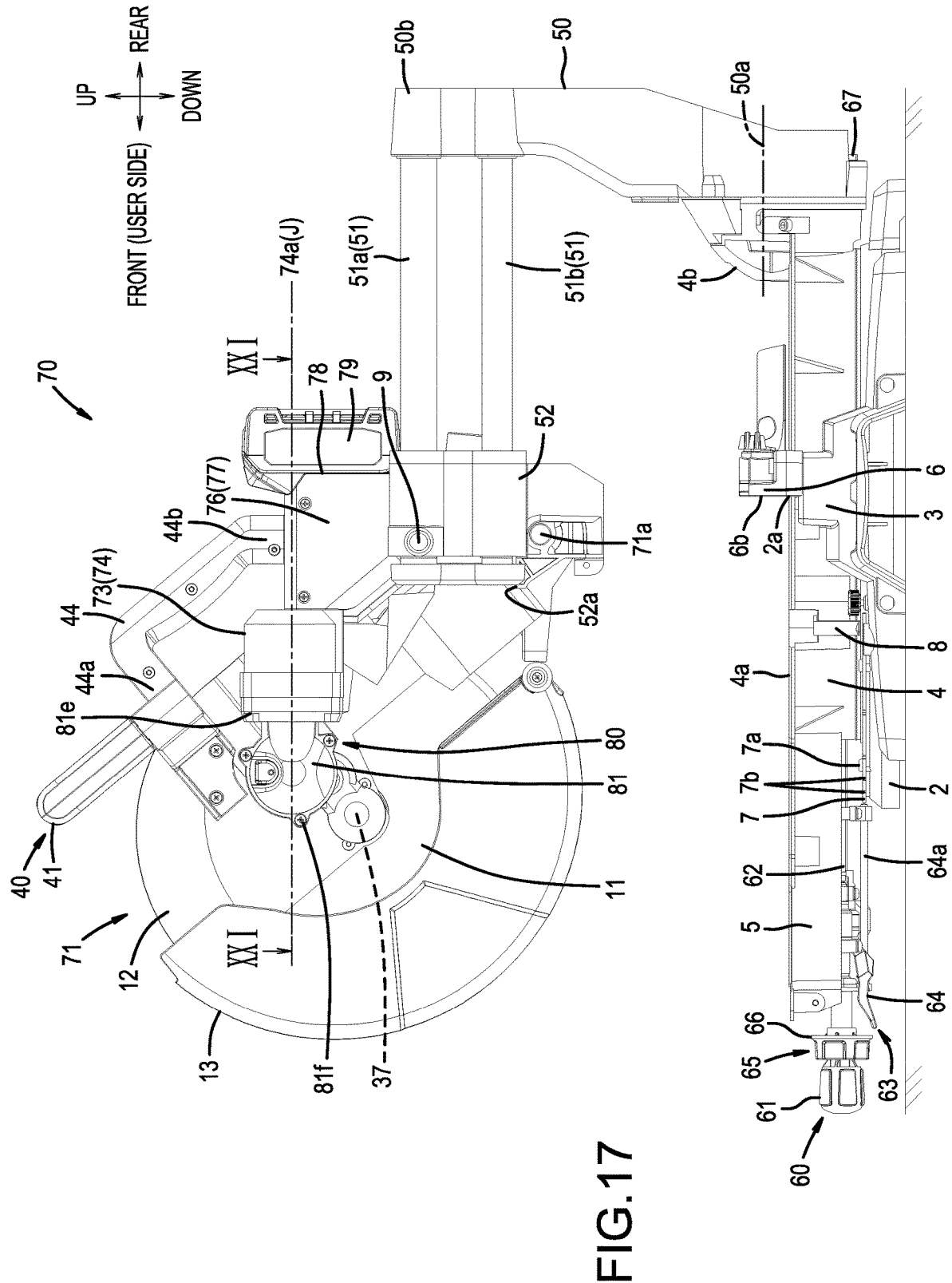
FIG. 17 is a right view of the sliding cutting machine in the state in which the cutting-machine main body is located at the top dead center.
Figure 18:
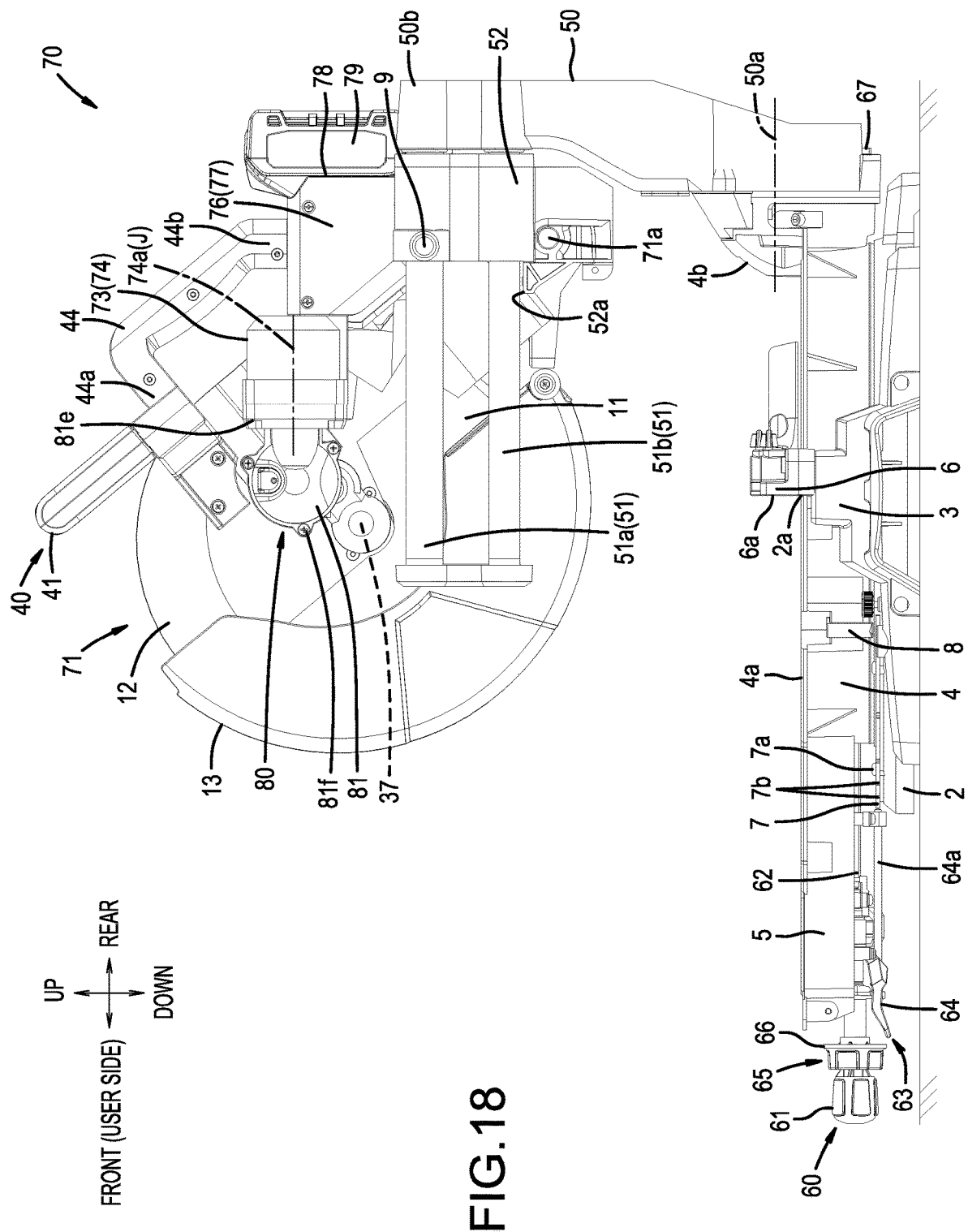
FIG. 18 is a right view of the sliding cutting machine in the state in which the cutting-machine main body is located at the top dead center and located at the rear end.

As shown in FIGS. 17 and 18, when the cutting tool 11 is vertical and the cutting-machine main body 71 is located at the top dead center, the electric motor 74 and the motive-power transmitting part 80 are located more upward than the first bar 51a. The motor shaft 74a is parallel to the horizontal plane when the cutting-machine main body 71 is located at the top dead center. When the cutting-machine main body 71 is located at top dead center, the motor shaft 74a is located more forward than the up-down swing shaft 71a.

Figure 19:
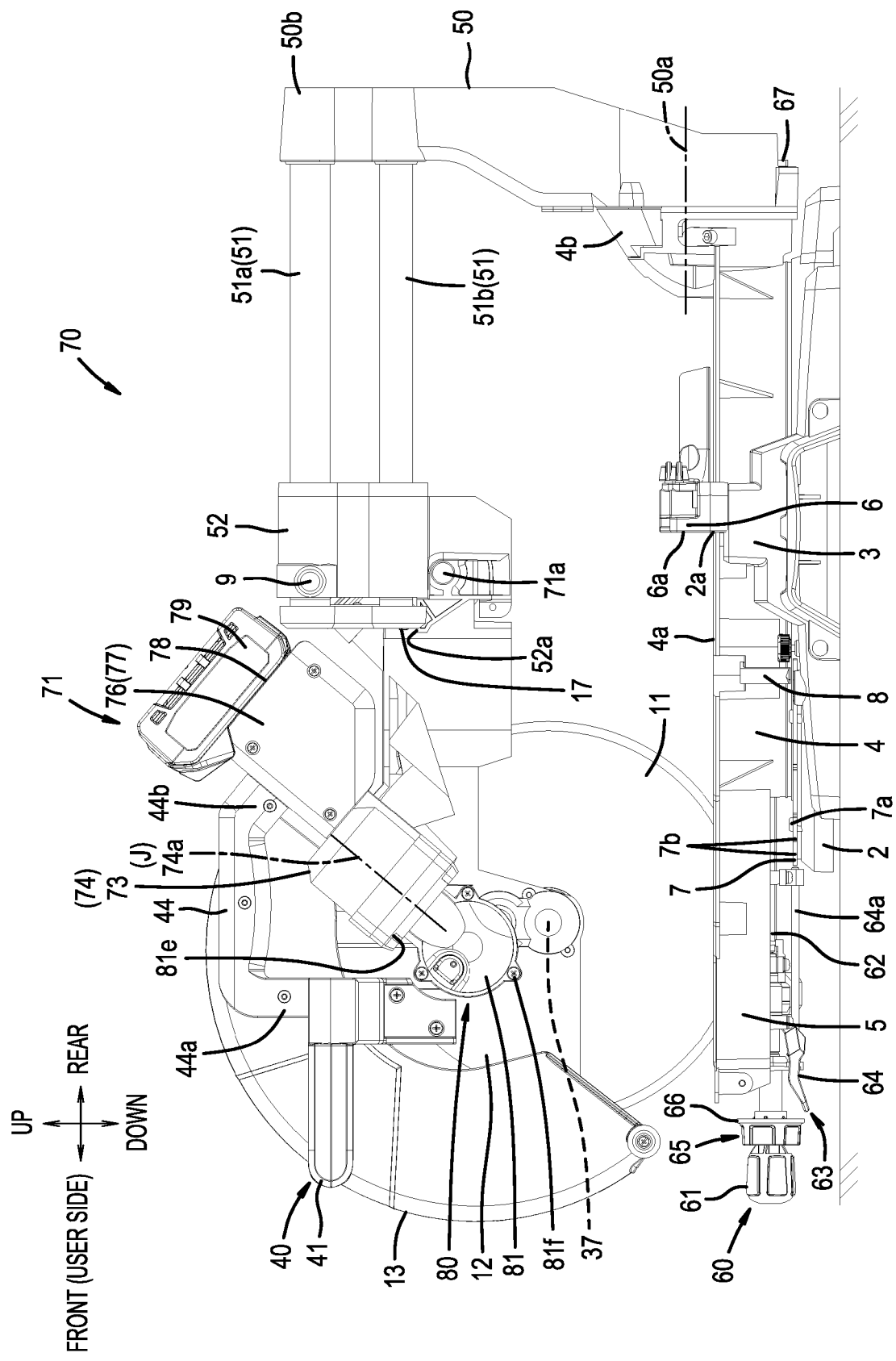
FIG. 19 is a right view of the sliding cutting machine in the state in which the cutting-machine main body is located at the bottom dead center.

As shown in FIGS. 19 and 20, when the cutting tool 11 is vertical and the cutting-machine main body 71 is located at the bottom dead center, the electric motor 74 and the motive-power transmitting part 80 overlap the slide bars 51 in the up-down direction. When the cutting-machine main body 71 is located at the bottom dead center, the side opposite of the gear of the motor shaft 74a is tilted upward as it goes (extends) rearward. That tilt angle is in the range of 30°-60° relative to the horizontal plane, more preferably is in the range of 35°-45°, and is, for example, 40°. Even when the cutting-machine main body 71 is located at the bottom dead center, the entire motor shaft 74a is located more forward than the up-down swing shaft 71a.

As shown in FIGS. 17 and 21, a rectangular-box shaped controller housing 76 is coupled to a rear portion of the motor housing 73. The second coupling part 44b of the carrying handle 44 is coupled to an upper portion of the controller housing 76. A controller 77, which controls the operation of the electric motor 74, etc., is housed in the controller housing 76. The controller 77 comprises: a case, which is substantially a shallow rectangular parallelepiped; and a control board (printed circuit board), which is housed within the case and is resin molded. The controller 77 is housed in the controller housing 76 with an attitude such that its thickness direction (the direction in which the shortest side of the case extends) goes (extends) along the front-rear direction, in which motor axis J extends. Principally, a control circuit for controlling the operation of the electric motor 74, a drive circuit, an auto-stop circuit, etc. are installed in the controller 77. The control circuit comprises a microcontroller (microprocessor), which transmits control signals to the electric motor 74 based on position information of the rotor 74b obtained by the sensor board 74d. The drive circuit comprises FETs (e.g., power FETs), which switch electric currents supplied to the electric motor 74 based on the control signals received from the control circuit. In response to detecting a depleted state or an abnormal state of the battery 79, the auto-stop circuit cuts off the supply of electric power to the electric motor 74 so that an over-discharged state or an excessive current state does not occur.

As shown in FIGS. 17 and 21, the battery-mount part 78 is provided at a rear portion of the controller housing 76. When the cutting-machine main body 71 is located at the top dead center, a mount surface of the battery-mount part 78 faces rearward and extends substantially perpendicular to motor axis J. The battery 79, which has a substantially rectangular-box shape, can be mounted on the battery-mount part 78 by sliding it downward from above. In addition, the battery 79 can be removed from the battery-mount part 78 by sliding it upward from below. The battery 79 is, for example, a lithium-ion battery having an output voltage of 36 V. The battery 79 can be recharged repeatedly by removing it from the battery-mount part 78 and using a charger to recharge it. The battery 79 can be used as a power supply for a variety of other types of cordless power tools such as a screwdriver, an electric drill, and the like.

As described above, the sliding cutting machine 70 comprises the slide bars 51, which have an elongate shape and extend in the front-rear direction as shown in FIGS. 4, 20. The sliding cutting machine 70 comprises the slide base 52, which is mounted on the slide bars 51 and slides along the slide bars 51 in the front-rear direction. The sliding cutting machine 70 comprises the cutting-machine main body 71, which is mounted such that it is swingable (pivotable) in the up-down direction about the up-down swing shaft 71a provided on the slide base 52. The cutting-machine main body 71 comprises the output shaft 37, which extends in the axial direction orthogonal to the slide bars 51 and on which the cutting tool 11 is mounted. The cutting-machine main body 71 comprises the electric motor 74, which is the motive-power source that drives the output shaft 37, is provided between the cutting tool 11 and the slide bars 51 when viewed from the front in the state in which the cutting tool 11 is vertical, and is located more upward than the slide bars 51. The cutting-machine main body 71 comprises the motive-power transmitting part 80, which transmits the driving force of the motor shaft 74a of the electric motor 74 to the output shaft 37. The motive-power transmitting part 80 is provided between the cutting tool 11 and the slide bars 51 when viewed from the front (along the extension direction of the slide bars 51a, 51b) and is located more upward than the slide bars 51 when the cutting-machine main body 71 is located at the top dead center. Accordingly, the sliding cutting machine 70 exhibits the same effects as those of the sliding cutting machine 1 shown in FIGS. 4, 10. That is, the cutting tool 11 can be disposed more proximate to the slide bars 51. Moreover, when the cutting-machine main body 71 is located at the top dead center, the visibility of the cutting-in position of the cutting tool 11 is satisfactory.

Various modifications can be made to the sliding cutting machines 1, 70 of the above-described Working Examples 1 and 2. For example, in Working Examples 1 and 2, the cutting-machine main body 10, 71 is supported such that it is movable in the front-rear direction along (by using) the slide bars 51, which are mounted on the main-body support arm 50. In addition, the main-body support arm 50 is supported such that it is tiltable relative to the arm-support part 4b of the turntable 4. However, the main-body support arm 50 may instead be configured such that it is supported directly on the base 2 or the placement surface. The present teachings can also be applied to a sliding cutting machine (e.g., a sliding miter saw) that does not comprise a left-right, tilt-angle, adjusting (bevel) mechanism in which the cutting-machine main body 10, 71 is tiltable in the left-right direction and/or to a sliding cutting machine (e.g., a sliding saw) that does not comprise a miter-angle adjusting mechanism that enables the turntable 4 to be rotatable in a horizontal plane relative to the base 2 (e.g., a bevel saw).

The arrangement of the cutting-machine main body 10, 71 in the left-right direction may be the reverse of that in the present disclosure. That is, the cutting tool 11 may instead be disposed on the right side, the slide bars 51 may instead be disposed on the left side, and the electric motor 23, 74, the handle part 40, the bottom-dead-center stopper 17, and the like may be disposed between the cutting tool 11 and the slide bars 51 in the left-right direction.

Although Working Examples 1 and 2 each comprise the two slide bars 51a, 51b, only one slide bar need be provided or three or more bars may be provided in parallel. The slide bars 51 need not be non-parallel to the side surface of the cutting tool 11. The slide bars 51 need not be non-parallel to the horizontal plane. Illustrative examples of the electric motors 23, 74 were given, in which, when the cutting-machine main body 10, 71 is located at the top dead center, motor axis J is parallel to the horizontal plane. However, the structure may instead be configured such that, when the cutting-machine main body 10, 71 is located at the top dead center, motor axis J extends downward from above toward the side opposite of the gear (rearward).

Illustrative examples of the motive-power transmitting parts 30, 80 were given, in which the reduction gear 35b of the first intermediate shaft 35 and the reduction gear 36a of the second intermediate shaft 36 reduce speed in two steps and transmit that motive power to the output shaft 37. Instead, for example, only one intermediate shaft or three or more intermediate shafts may be provided. An illustrative example of a configuration was given in which the manipulatable handle 41 has a loop shape extending in the left-right direction. Instead, the manipulatable handle 41 may be provided with a loop shape extending, for example, in the front-rear direction parallel to motor axis J. An illustrative example of a configuration was given in which the top-dead-center stopper 18 is provided leftward of the fixed cover 12. Instead, the top-dead-center stopper 18 may be provided between the cutting tool 11 and the slide bars 51 in the left-right direction, the same as in the bottom-dead-center stopper 17.

The term "motive-power transmitting part" is intended to encompass a wide variety of speed-reducing mechanisms (transmissions) that comprise one or more gear stages. An output (e.g., a shaft) of the speed-reducing mechanism (transmission) rotates slower than the motor shaft of the electric motor but at a higher torque.

EXPLANATION OF THE REFERENCE NUMBERS

1 Sliding cutting machine
2 Base
2a Rotary spindle
3 Upward-protruding part
4 Turntable
4a Table upper surface
4b Arm-support part
5 Table-extension part
5a Slot
6 Positioning fence
6a Upward-extending fence
6b Positioning surface
7 Miter scale plate
7a Fixing screw
7b Positioning, recessed part
8 Indicator
9 Knob
10 Cutting-machine main body
10a Up-down swing shaft
11 Cutting tool
11a Diameter
12 Fixed cover
12a Gear-housing part
12b, 12c Hole parts
12d Gear-housing coupling part
13 Movable cover
14 Fixing screw
15 Outer flange
16 Inner flange
17 Bottom-dead-center stopper
17a Center
18 Top-dead-center stopper
19 Bottom-dead-center lock pin
19a Through hole
20 Motor housing
21 Rear-portion housing
21a Front end
21b Fixing screw
22 Front-portion housing
22a Rear end
22b Shaft-support part
22c, 22d Hole parts
22e Fixing screw
23 Electric motor
23a Motor shaft
23b Stator
23c Rotor
23d Commutator
23e First bearing
23f Second bearing
24 Fan
25 Power-supply cord
30 Motive-power transmitting part
31 Shaft housing
31a Motor-housing coupling part
31b Gear-housing coupling part (expanded portion)
32 Shaft
32a Drive-side end
32b Follower-side end
32c Diameter
32d Coupling sleeve
32e Drive-side bevel gear
32f Nut
32g Third bearing
32h Fourth bearing
32i Washer
32j Length
33 Gear housing
33a Shaft-housing coupling part 33b Fixed-cover coupling part
33c, 33d Hole parts
33e, 33f Fixing screws
34 Bearing box
34a, 34b, 34c Hole parts
34d Fixing screw
35 First intermediate shaft
35a Follower side bevel gear
35b Reduction gear
35c Fifth bearing
35d Sixth bearing
35e Washer
35f Rubber ring
35g Washer
35h Ring stop
36 Second intermediate shaft
36a Reduction gear
36b Seventh bearing
36c Eighth bearing
37 Output shaft
37a Reduction gear
37b Ninth bearing
37c Tenth bearing
40 Handle part
41 Manipulatable handle
41a Center
42 Switch lever
43 Lock-off button
44 Carrying handle
44a First coupling part
44b Second coupling part
50 Main-body support arm
50a Left-right tilting pivot
50b Upper part
51 Slide bar
51a First bar
51b Second bar
51c, 51d Centers
51e, 51f Diameters
51g Center-to-center distance
52 Slide base
52a Bottom-dead-center, stopper-contact part
52b Top-dead-center, stopper-contact part
60 Turntable-fixing mechanism
61 Grip
62 Fixing rod
63 Positive-lock mechanism
64 Lock-release lever
64a Positioning pin
65 Tilt-fixing mechanism
66 Tilt-fixing manipulatable part
66a Transmission shaft
67 Receiving part
67a Slot
70 Sliding cutting machine
71 Cutting-machine main body
71a Up-down swing shaft
73 Motor housing
73a Front end
74 Electric motor
74a Motor shaft
74b Rotor
74c Stator
74d Sensor board
74e Drive-side bevel gear
74f Nut
74g First bearing
74h Second bearing
74i Washer
75 Fan
76 Controller housing
77 Controller
78 Battery-mount part
79 Battery
80 Motive-power transmitting part
81 Gear housing
81a Motor-housing coupling part
81b Fixed-cover coupling part
81c, 81d Hole parts
81e, 81f Fixing screws
J Motor axis
S1 First virtual plane
S2 Second virtual plane

The invention claimed is:

1. A sliding cutting machine comprising:
   at least one slide bar having an elongated shape;
   a slide base mounted on the at least one slide bar and being slidable along the at least one slide bars; and
   a cutting-machine main body mounted on the slide base and configured to be pivotable relative to the at least one slide bar in an up-down direction about a pivot shaft;
   wherein:
   the cutting-machine main body comprises:
      an output shaft extending in an axial direction that is orthogonal to an extension direction of the at least one slide bar and configured to mount a cutting tool;
      an electric motor supplying motive power for driving the output shaft, the electric motor being provided between the cutting tool and the at least one slide bar when viewed along the extension direction of the at least one slide bar in a state in which the cutting tool extending in a vertical plane, and being located more upward than the at least one slide bar when the cutting-machine main body is located at a top dead center; and
      a motive-power transmitting part configured to transmit the motive power of a motor shaft of the electric motor to the output shaft; and
   the motive-power transmitting part is provided between the cutting tool and the at least one slide bar when viewed along the extension direction of the at least one slide bar and is located upward of the at least one slide bar when the cutting-machine main body is located at the top dead center.

2. The sliding cutting machine according to claim 1, wherein:
   the motive-power transmitting part comprises a shaft configured to transmit the motive power received from the motor shaft to the output shaft; and
   the shaft intersects the at least one slide bar when viewed along the axial direction and the cutting-machine main body is located at a bottom dead center.

3. The sliding cutting machine according to claim 2, wherein the shaft has an outer diameter that is 1/40-1/20 of an outer diameter of the cutting tool.

4. The sliding cutting machine according to claim 2, comprising:
   a shaft housing, which has a tube shape and houses the shaft;
   wherein the shaft housing comprises an expanded portion, which widens in the radial direction of the shaft over the range of a follower-side end of the shaft coupled to the output shaft.

5. The sliding cutting machine according to claim 1, wherein a distance in the axial direction from the cutting tool to the at least one slide bar is ¾ or less of an outer diameter of the cutting tool.

6. The sliding cutting machine according to claim 1, wherein, when the cutting-machine main body is located at a bottom dead center, the electric motor is entirely located between the output shaft and the pivot shaft along the extension direction of the at least one slide bar.

7. The sliding cutting machine according to claim 1, wherein, when the cutting-machine main body is located at the top dead center, the electric motor is entirely located more rearward than the pivot shaft.

8. The sliding cutting machine according to claim 1, wherein the motor shaft extends parallel to a side surface of the cutting tool when viewed from a radial direction of the motor shaft in the state in which the cutting tool is extending in the vertical plane or is tilted by 10° or less relative to the side surface.

9. The sliding cutting machine according to claim 1, wherein a center of the electric motor is disposed at a location that is 30%-50% of a distance from the cutting tool to the at least one slide bar in a surface-normal direction of the cutting tool, with the cutting tool serving as the starting point.

10. The sliding cutting machine according to claim 1, wherein the electric motor is a brushed motor configured to be powered by alternating current.

11. The sliding cutting machine according to claim 1, wherein:
the at least one slide bars comprises first and second slide bars provided in parallel to each other;
the first slide bar is located upward of the second slide bar; and
an outer diameter of the first slide bar is given as a (mm), an outer diameter of the second slide bar is given as b (mm), a center-to-center distance between the first bar and the second bar is given as c [mm], an outer diameter of the cutting tool is given as d (mm), and the relationship below is satisfied:

$(a/2+b/2+c) \times 2 < d < (a/2+b/2+c) \times 3.5.$

12. The sliding cutting machine according to claim 1, wherein the motor shaft is oriented such that, when the cutting-machine main body is located at a bottom dead center, the motor shaft assumes a tilt angle such that the motor shaft tilts upward as the motor shaft extends rearward.

13. The sliding cutting machine according to claim 12, wherein the tilt angle of the motor shaft, when the cutting-machine main body is located at the bottom dead center, is 30°-60° relative to a horizontal plane that is perpendicular to the vertical plane.

14. The sliding cutting machine according to claim 13, wherein, when the cutting-machine main body is located at the top dead center, the motor shaft is parallel to the horizontal plane or assumes a tilt angle that is 10° or less relative to the horizontal plane.

15. The sliding cutting machine according to claim 1, further comprising:
a manipulatable handle configured to be grasped to move the cutting-machine main body relative to the at least one slide bar; and
in the state in which the cutting tool is extending in the vertical plane, a center of the manipulatable handle is located along a virtual plane that contains the cutting tool when viewed along the extension direction of the at least one slide bars and is located between the at least one slide bar and the cutting tool.

16. The sliding cutting machine according to claim 15, wherein the center of the manipulatable handle is disposed at a location that is 30%-70% of the distance from the cutting tool to the at least one slide bar in the axial direction with the cutting tool serving as the starting point.

17. The sliding cutting machine according to claim 1, further comprising:
a bottom-dead-center stopper configured to block movement of the cutting-machine main body to below a bottom dead center;
wherein, in the state in which the cutting tool is extending in the vertical plane, a center of the bottom-dead-center stopper is located between the at least one slide bar and the cutting tool when viewed along the extension direction of the at least one slide bar.

18. The sliding cutting machine according to claim 17, wherein the center of the bottom-dead-center stopper is disposed at a location that is 30%-70% of the distance from the cutting tool to the at least one slide bar in the axial direction with the cutting tool serving as the starting point.

19. The sliding cutting machine according to claim 3, wherein:
a distance in the axial direction from the cutting tool to the at least one slide bar is ¾ or less of the outer diameter of the cutting tool;
when the cutting-machine main body is located at the bottom dead center, the electric motor is entirely located between the output shaft and the pivot shaft along the extension direction of the at least one slide bar;
when the cutting-machine main body is located at the top dead center, the electric motor is entirely located more rearward than the pivot shaft;
the motor shaft extends parallel to a side surface of the cutting tool when viewed from a radial direction of the motor shaft in the state in which the cutting tool is extending in the vertical plane or is tilted by 10° or less relative to the side surface; and
the center of the electric motor is disposed at a location that is 30%-50% of the distance from the cutting tool to the at least one slide bars in a surface-normal direction of the cutting tool with the cutting tool serving as the starting point.

20. The sliding cutting machine according to claim 18, wherein:
the electric motor is a brushed motor configured to be powered by alternating current;
the at least one slide bar comprises first and second slide bars provided in parallel to each other;
the first slide bar is located upward of the second slide bar;
an outer diameter of the first slide bar is given as a (mm), an outer diameter of the second slide bar is given as b (mm), a center-to-center distance between the first bar and the second bar is given as c [mm], an (the) outer diameter of the cutting tool is given as d (mm), and the relationship below is satisfied:

$(a/2+b/2+c) \times 2 < d < (a/2+b/2+c) \times 3.5,$ the motor shaft is oriented such that, when the cutting-machine main body is located at the bottom dead center, the motor shaft assumes a tilt angle such that the motor shaft tilts upward as the motor shaft extend rearward,
the tilt angle of the motor shaft, when the cutting-machine main body is located at the bottom dead center, is 30°-60° relative to a horizontal plane that is perpendicular to the vertical plane, and when the cutting-machine main body is located at the top dead center, the motor shaft is parallel to the horizontal plane or assumes a tilt angle that is 10° or less relative to the horizontal plane.

* * * * *